(12) United States Patent
Duval

(10) Patent No.: US 7,677,540 B1
(45) Date of Patent: Mar. 16, 2010

(54) DUAL PULLEY CONSTANT FORCE MECHANISM

(76) Inventor: Eugene F. Duval, 2141 Camino a Los Cerros, Menlo Park, CA (US) 94025

( * ) Notice: Subject to any disclaimer, the term of this patent is extended or adjusted under 35 U.S.C. 154(b) by 831 days.

(21) Appl. No.: 10/816,616

(22) Filed: Apr. 2, 2004

Related U.S. Application Data

(60) Provisional application No. 60/460,771, filed on Apr. 4, 2003.

(51) Int. Cl.
*F16F 1/06* (2006.01)
(52) U.S. Cl. .................. 267/179; 267/221; 267/170; 267/175
(58) Field of Classification Search ............. 185/37, 185/39, 40 A, 43; 482/121; 267/170, 174, 267/175, 179, 221
See application file for complete search history.

(56) References Cited

U.S. PATENT DOCUMENTS

| 273,720 | A | | 3/1883 | George | |
|---|---|---|---|---|---|
| 1,063,242 | A | | 6/1913 | Catucci | |
| 3,141,660 | A | * | 7/1964 | Clarke et al. | 267/166 |
| 3,782,355 | A | * | 1/1974 | Hamman | 123/185.3 |
| 3,903,704 | A | * | 9/1975 | Spiridonov | 405/229 |
| 4,019,490 | A | * | 4/1977 | Reese | 123/185.2 |
| 4,231,568 | A | * | 11/1980 | Riley et al. | 482/130 |
| 4,480,605 | A | * | 11/1984 | Bloemers | 123/185.3 |
| 4,592,697 | A | | 6/1986 | Tuda et al. | 414/719 |
| 5,044,614 | A | * | 9/1991 | Rau | 267/221 |
| 6,649,850 | B2 | | 11/2003 | Strohmeier | 177/232 |
| 6,676,118 | B2 | * | 1/2004 | Chou | 267/177 |
| 7,156,784 | B2 | * | 1/2007 | Plavsic | 482/121 |

* cited by examiner

*Primary Examiner*—David M Fenstermacher
(74) *Attorney, Agent, or Firm*—Fliesler Meyer LLP

(57) ABSTRACT

A mechanism for converting the force from a linear extension spring into a constant force. A cable, connected to the spring, rides in a variable radius input pulley groove. A second cable rides in a variable radius output pulley groove. The dual pulley mechanism is smaller than previous spiral pulley mechanisms. The output force and stroke is a function of the sizes of both pulleys. A standardized design enables a small number of input and output pulleys to cover a large range of applications. An end plug in a helical spring can be used to make fine adjustments to the output force. The pulleys can be accurately phased relative to each other with a spline mechanism. The pulley grooves may lie in a plane, or they may advance in an axial direction as the pulley rotates. By continuously varying the rate of axial advance, the tangent to the groove can be aimed or focused at an external point. The focused groove reduces cable friction and wear. Axially advancing the groove allows the pulley to rotate more than one revolution, further reducing the size of the pulley. The input and output grooves can be combined into one continuous groove. The input and output cables can be a single continuous piece, eliminating cable terminations and reducing stress on the pulley.

7 Claims, 24 Drawing Sheets

Chain and fusee
From "Diderot et d'Alembert," 1751-1772, Horlogerie, page CC

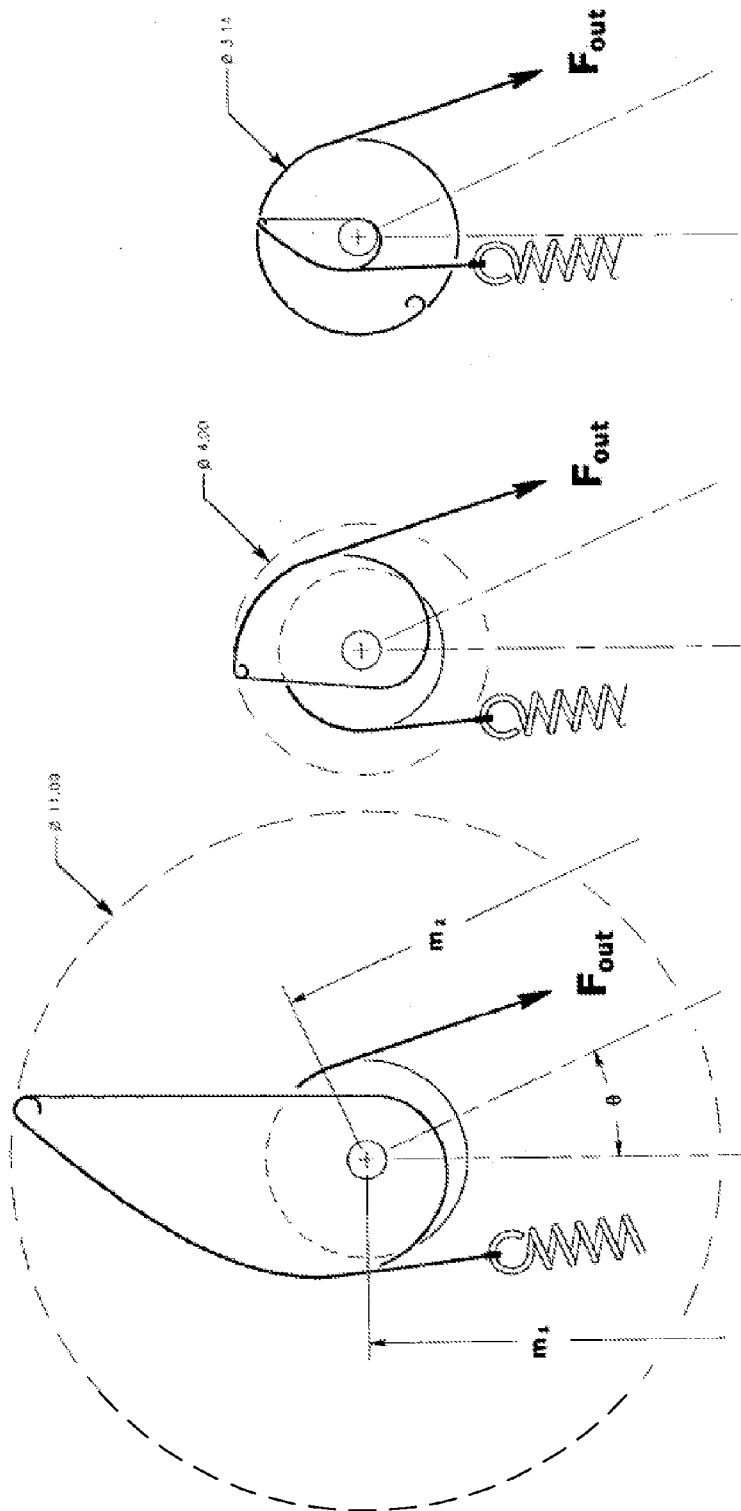

Constant Force Mechanism
Parabolic Torque Profile
$L_1 = L_2$
$\lambda_{max} = 290$ degree Constant Force Mechanism
Composite Torque Profile
$L_1 = L_2$
$\lambda_{max} = 300$ degree Constant Force Mechanism
Composite Torque Profile
$L_1 < L_2$
$\lambda_{max} = 300$ degree

DUAL PULLEY AND SPRING ASSEMBLY WITH DIFFERENTIAL SPLINE HUB

DUAL PULLEY ASSEMBLY
WITH DIFFERENTIAL SPLINE HUB

ADJUSTABLE END PLUG

INPUT PULLEYS  OUTPUT PULLEYS

PULLEY ASSORTMENT

DUAL PULLEY ASSEMBLY WITH RADIAL GROOVES

ADJUSTABLE SPRING
AND DUAL HELICAL PULLEY

ONE-PIECE
DUAL HELICAL PULLEY

FOCUSED-GROOVE
DUAL HELICAL PULLEY

Helical Spring
Force Deflection Curve

Pulley and Spring
Free Body Diagram

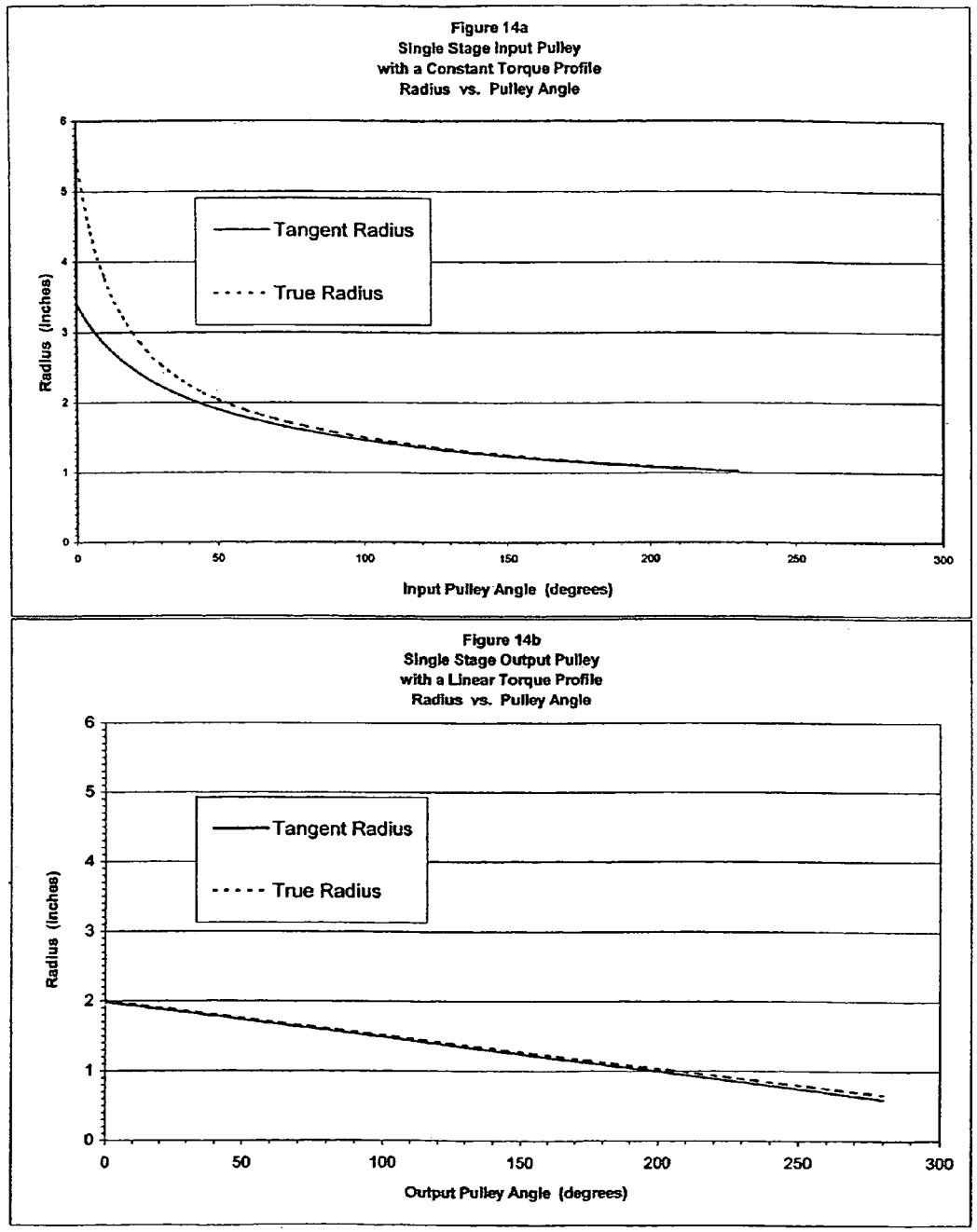

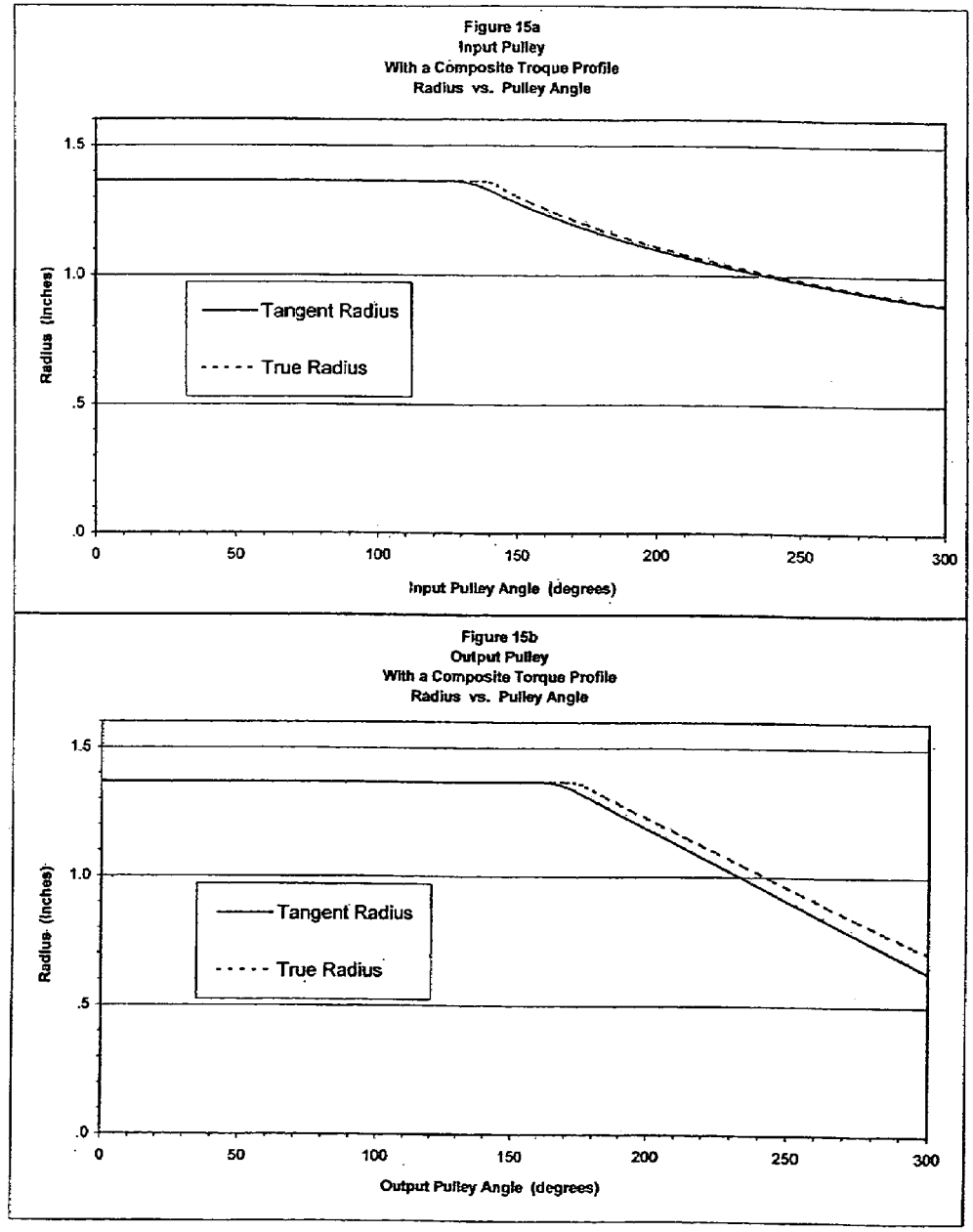

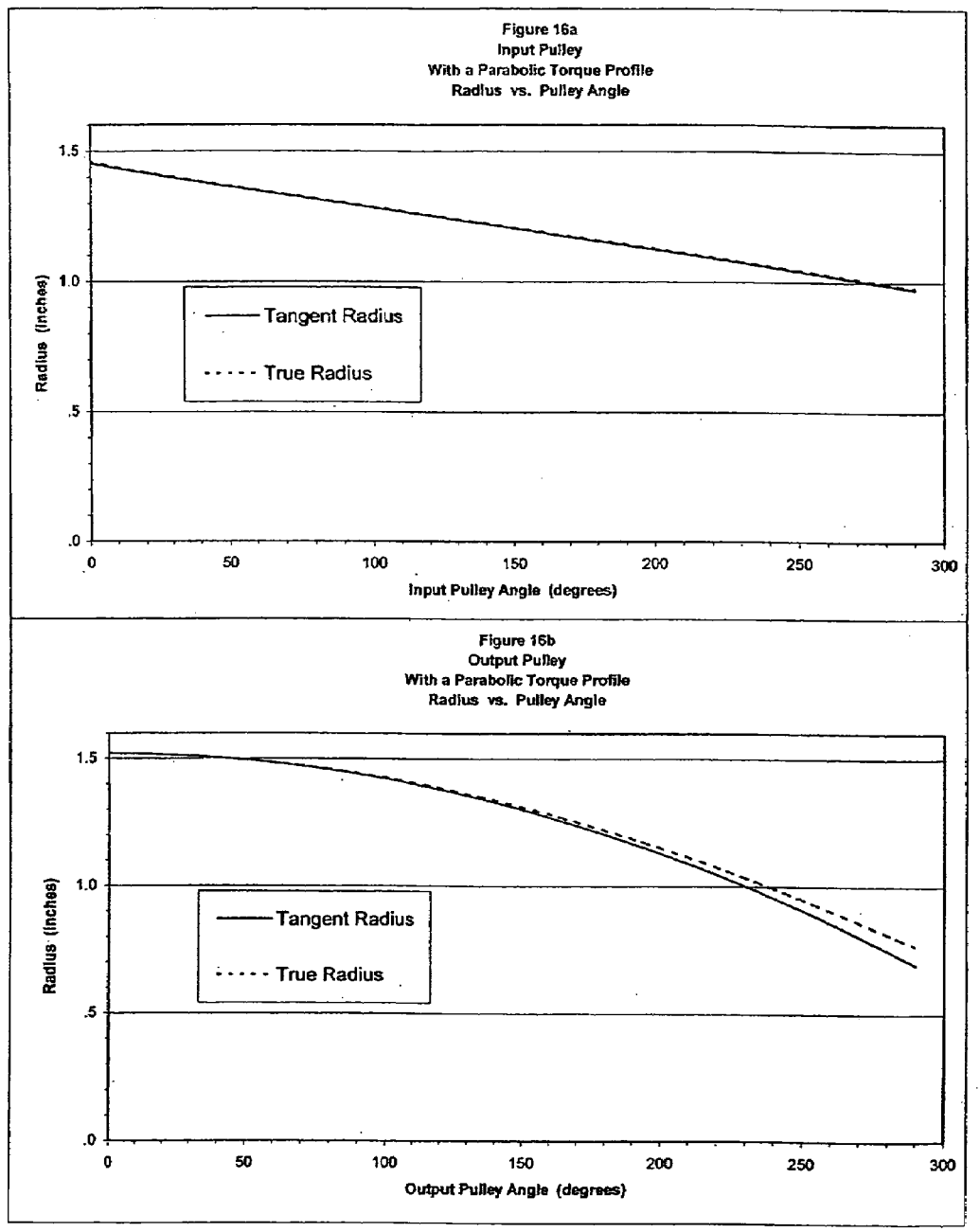

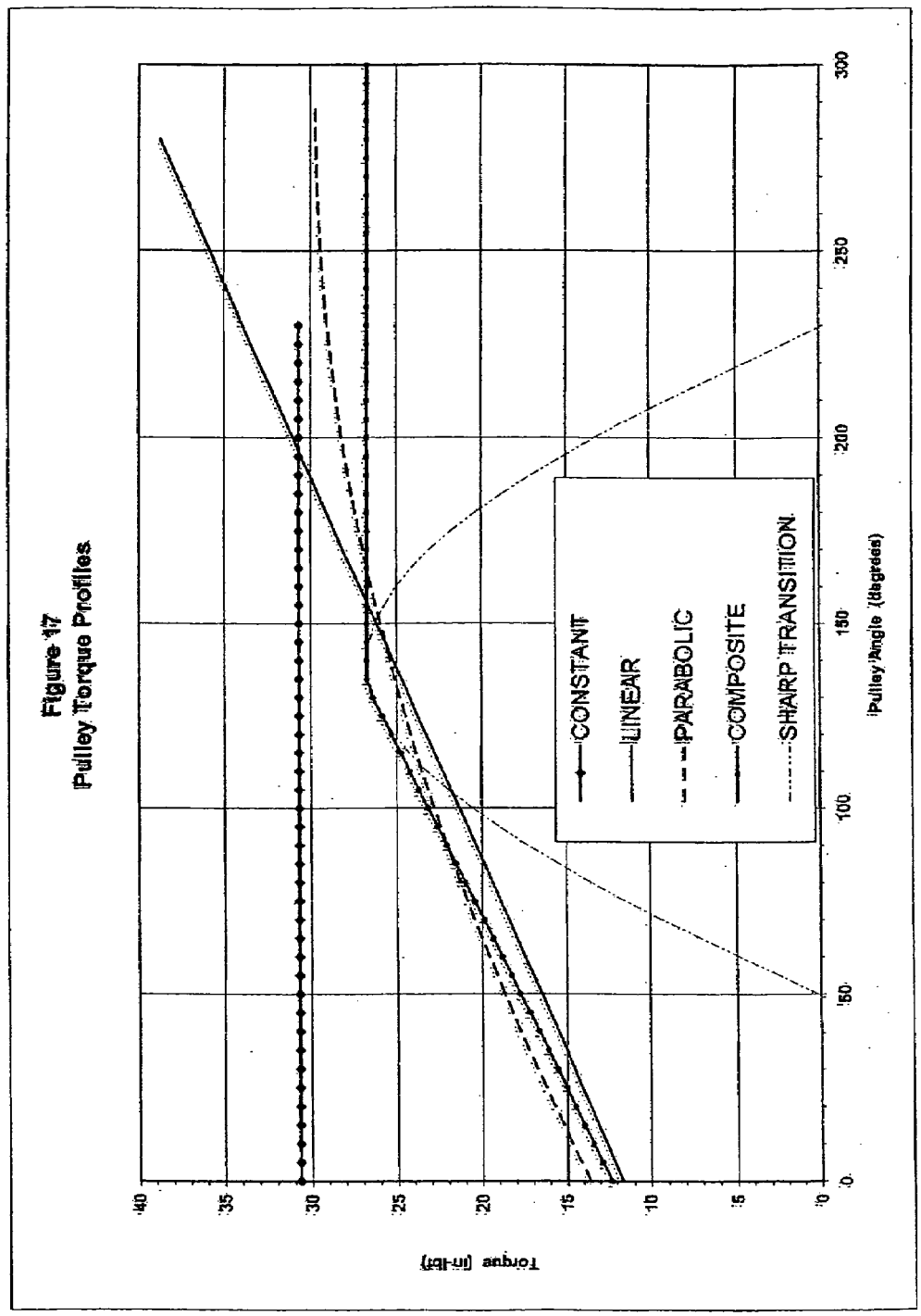

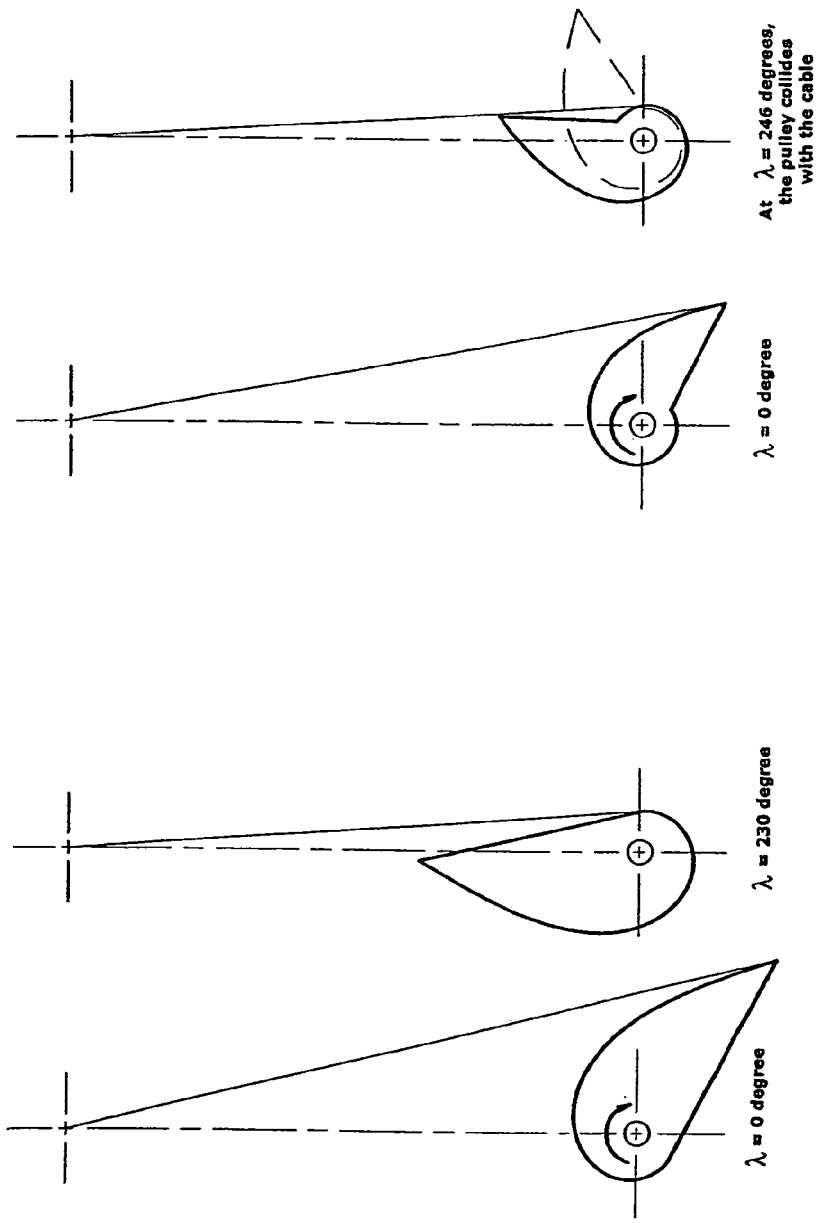

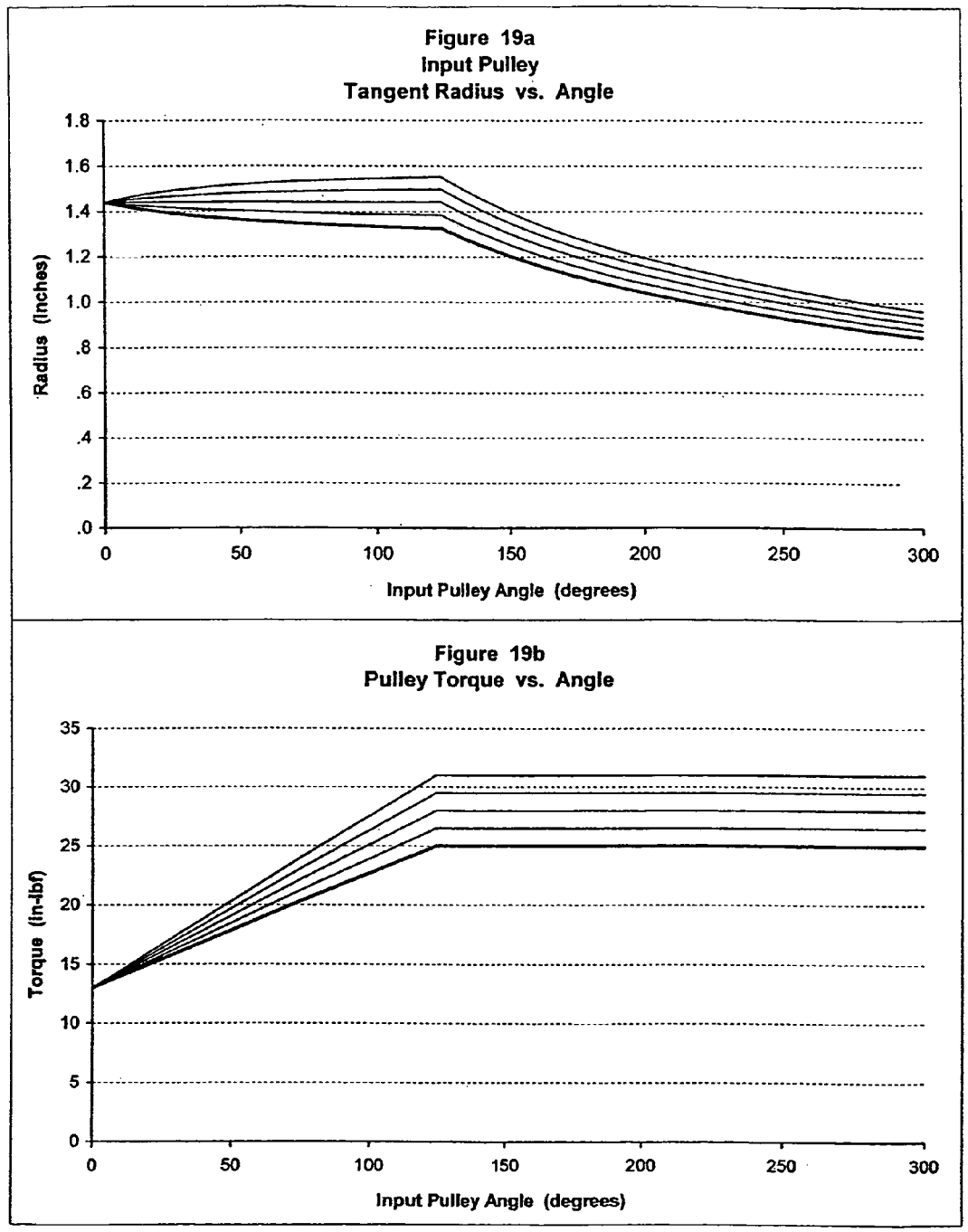

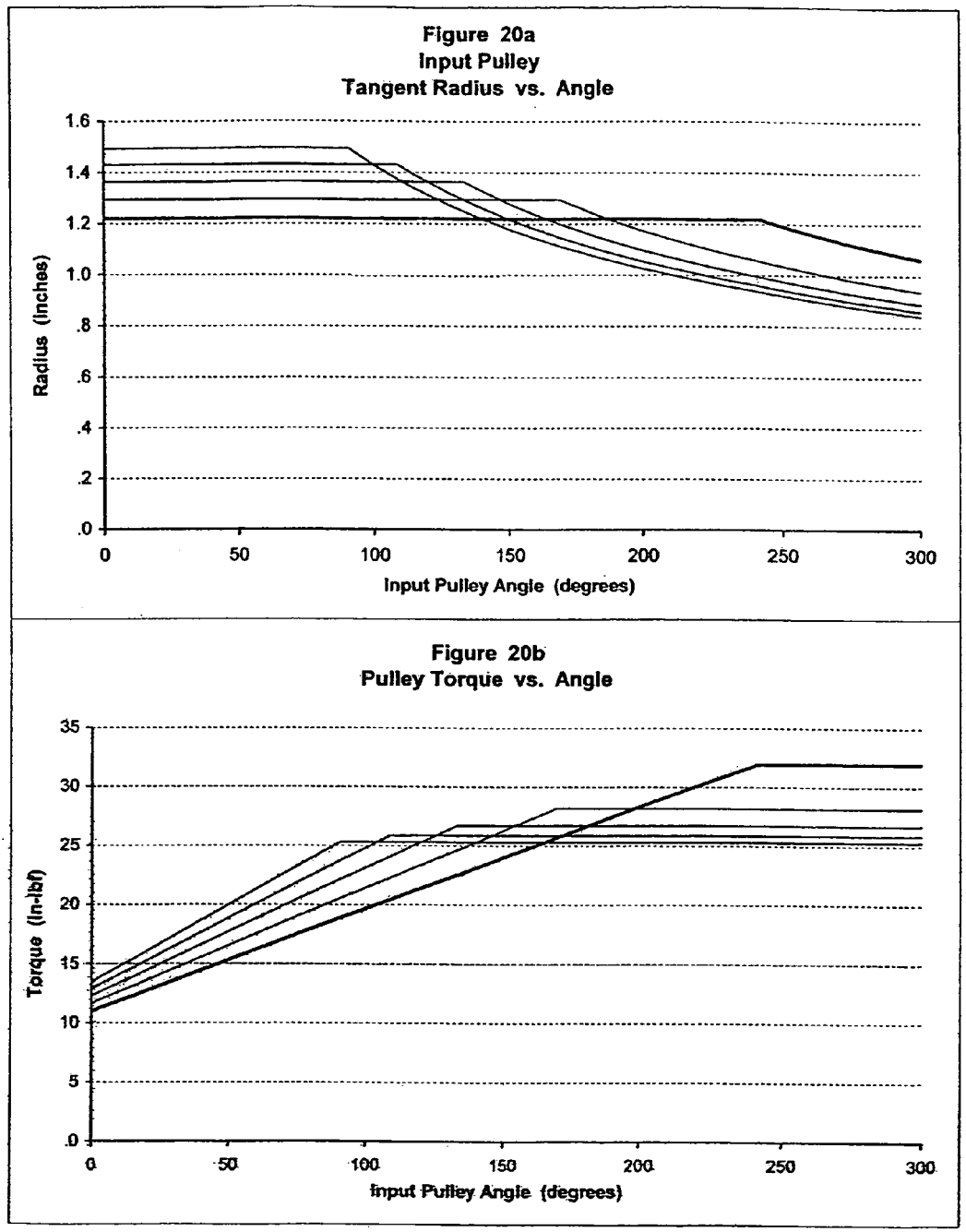

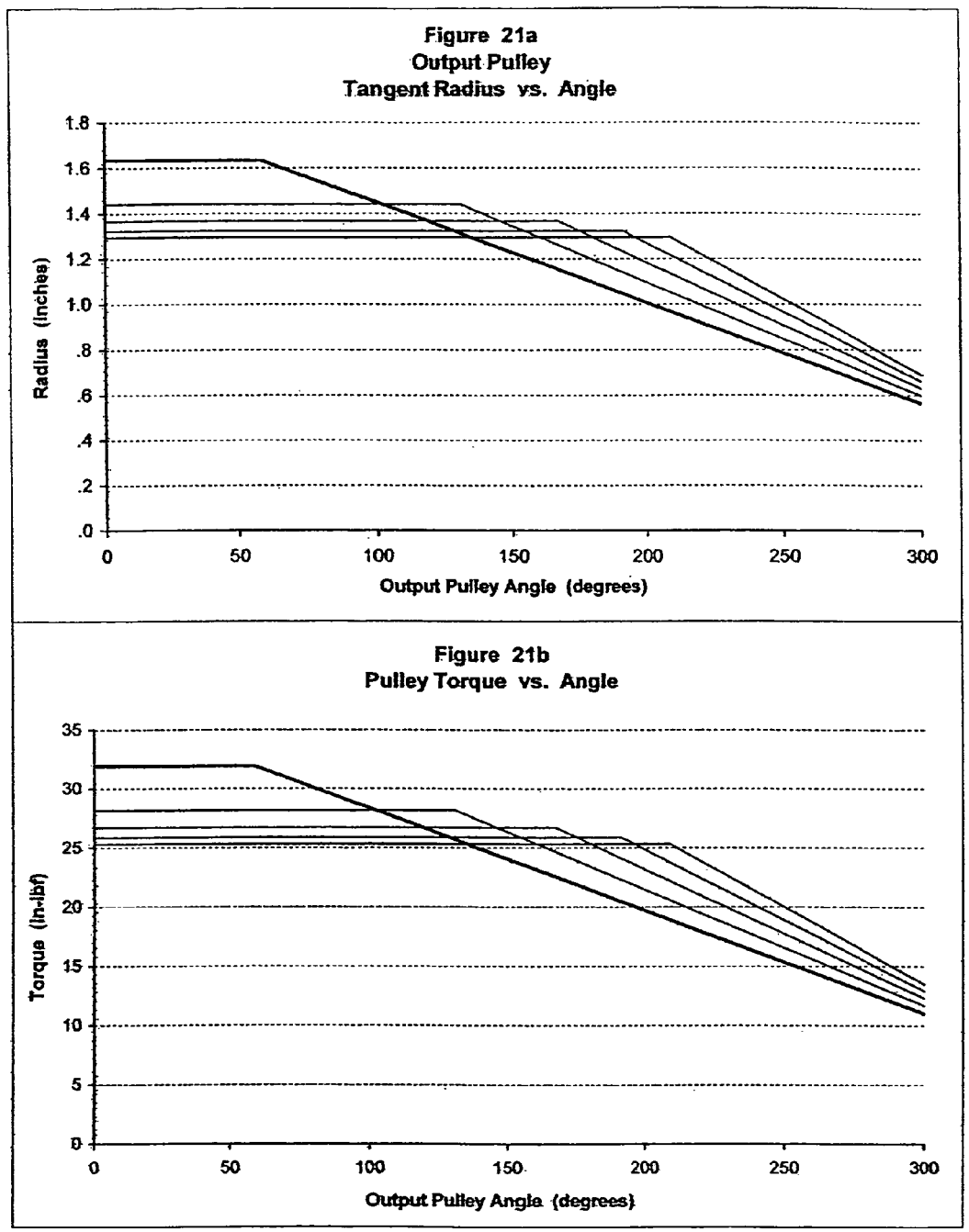

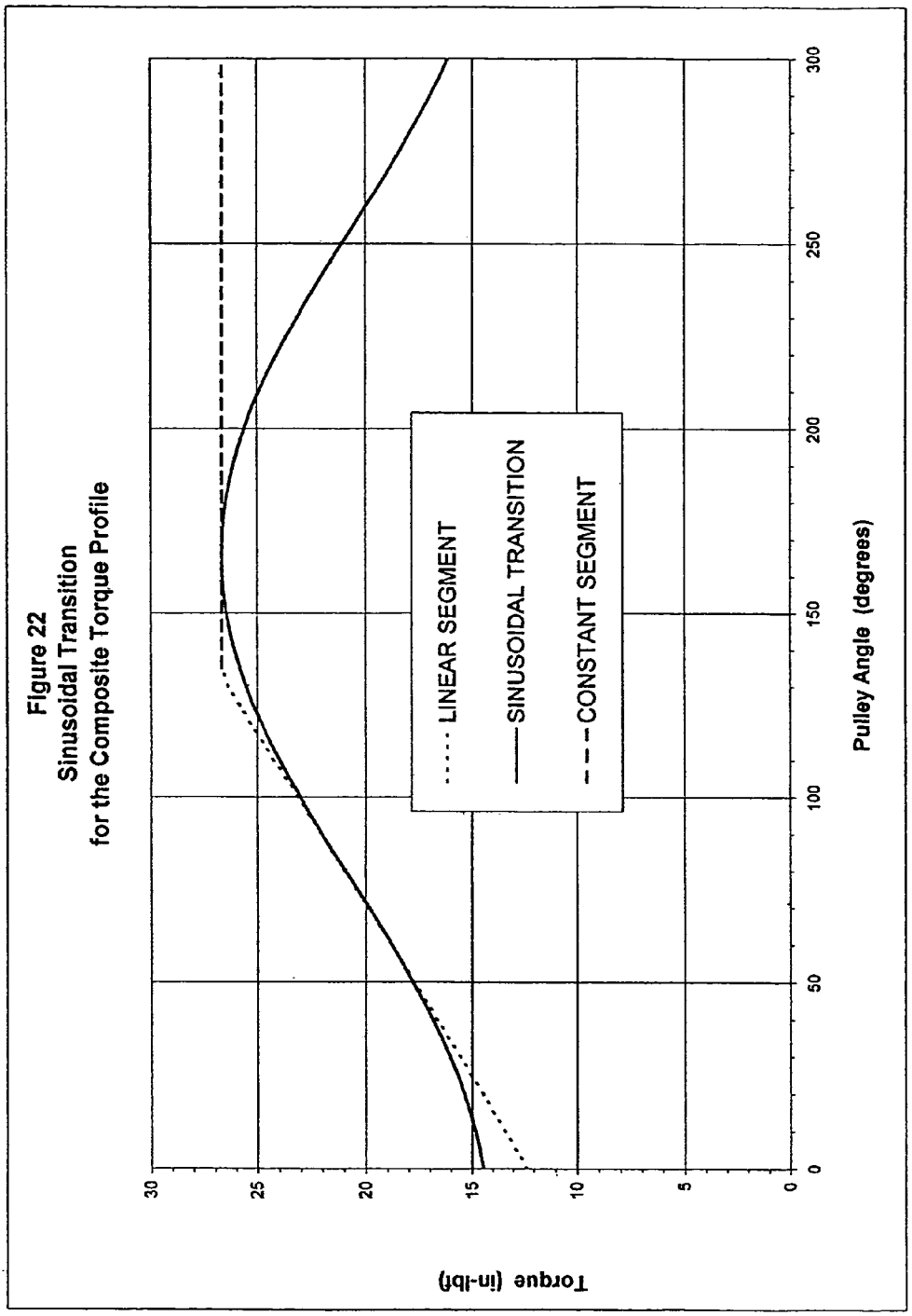

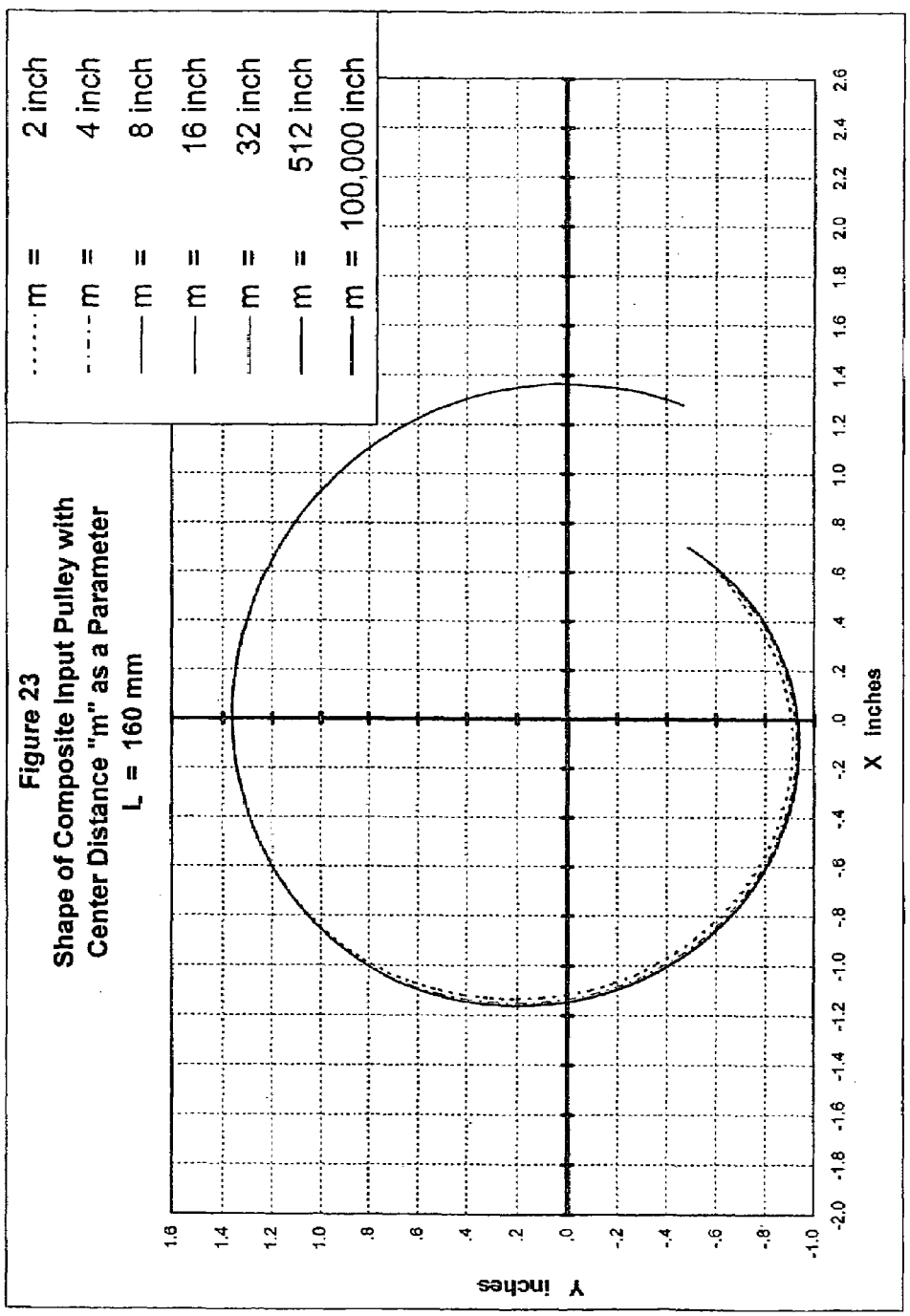

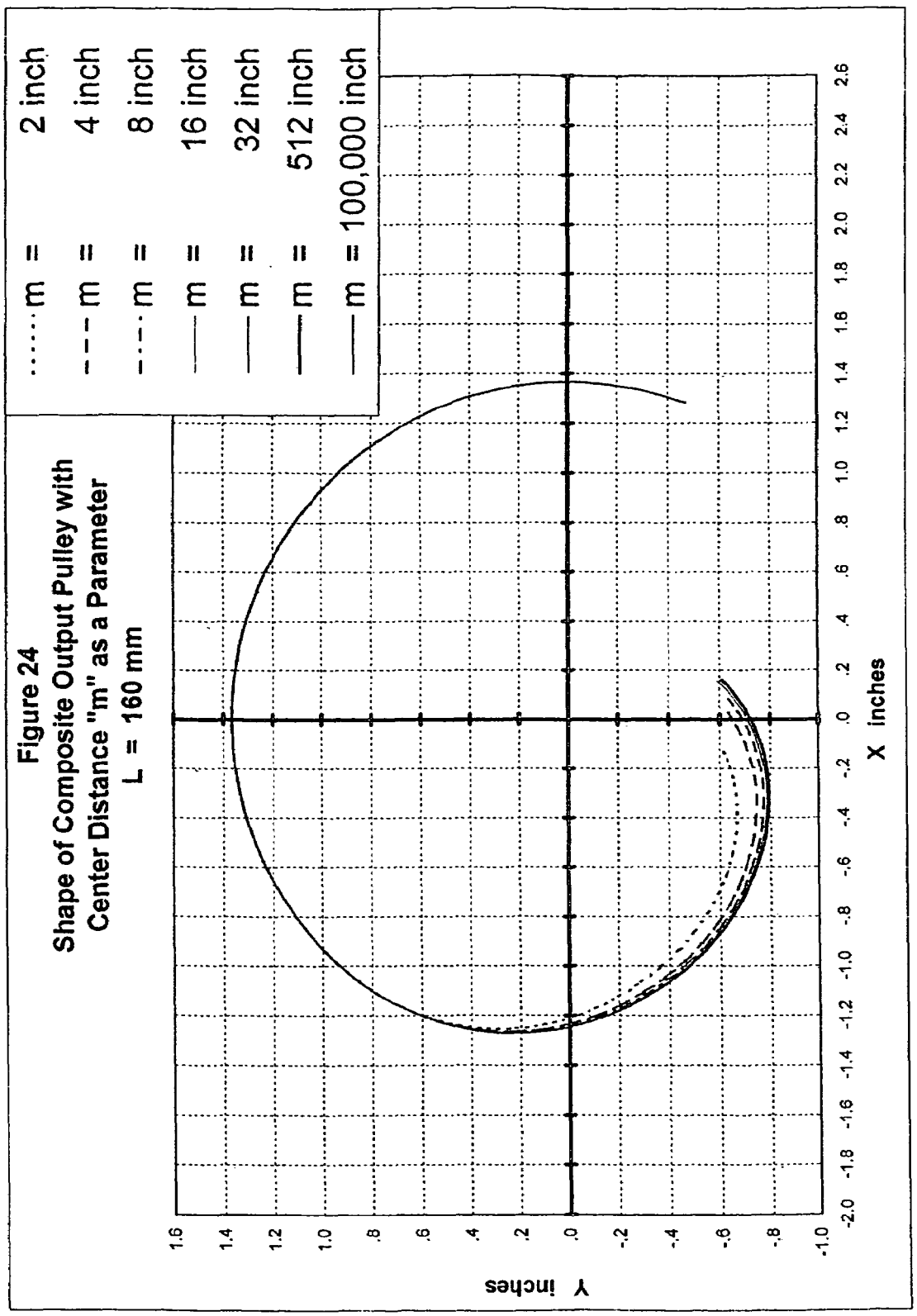

DUAL PULLEY CONSTANT FORCE MECHANISM

CLAIM TO PRIORITY

This application claims benefit to U.S. Provisional Application No. 60/460,771, filed Apr. 4, 2003, which is incorporated herein by reference in its entirety.

FIELD OF THE INVENTION

This invention relates to mechanisms that convert the force or torque from a spring into a constant force or torque.

BACKGROUND OF THE INVENTION

Figure 1A:
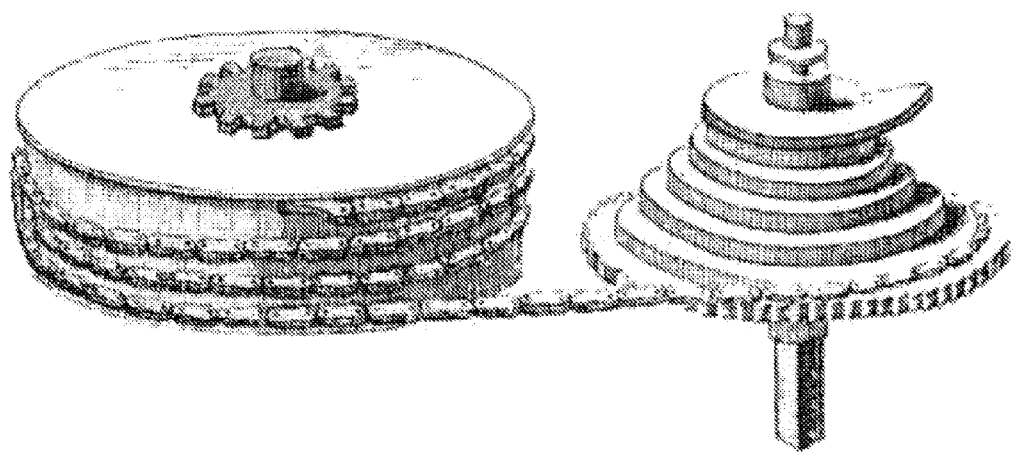
Figure 1B:
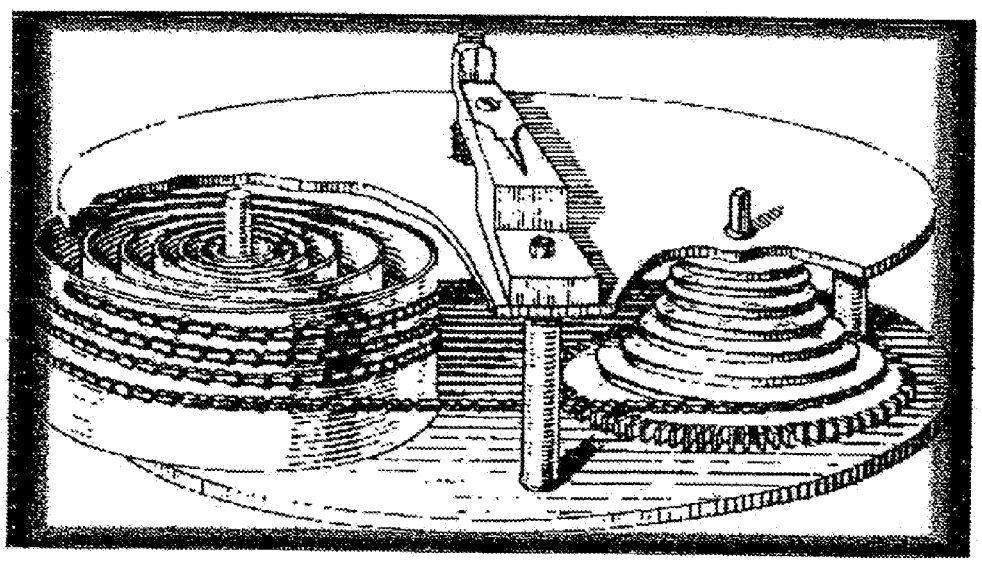

In the mid 1400's, conical shaped spiral pulleys called fusees were first used to improve the accuracy of spring-powered clocks. The fusee converted the linearly increasing torque from a power spring into a constant torque. FIGS. 1a and 1b show two different fusee mechanisms. In both figures, the clock spring is located inside a drum on the left, and the conical fusee is located on the right. A flexible chain connects the drum to the fusee. The drum acts as a constant radius pulley and the fusee acts as a variable radius pulley.

The fusee fell out of favor after the invention of constant force and constant torque springs. The constant torque power springs were no larger than the linear power springs that they replaced. The fusee clocks were larger and they had more moving parts. Constant force and constant torque springs haven't replaced spiral pulleys for all applications. They store less energy per pound and they have a shorter life than other springs. Their force fluctuates slightly as they extend and retract. It's difficult to produce constant force springs with a tight force tolerance. They are not adjustable. In the United States, only a few dozen sizes of constant force springs are available from stock. Other sizes must be custom made.

In addition to the extra parts and space required, spiral pulleys and fusees have other problems. The cables can rub and wear on the sides of the grooves in the fusee. Rubbing occurs when the cable is not tangent to the groove. For example, if the cable approaches the fusee from a nearby idler pulley, the angle between the cable and the groove can be large. This angular error is often called the "fleet angle". U.S. Pat. No. 5,037,059 discusses one specific solution to this problem.

Spiral pulleys and fusees are poorly understood and difficult to design. The shape and size of a spiral pulley is affected by many parameters. Most patents give only a limited description of their geometry. For example, the 059 patent describes the fusee as "corn shaped". U.S. Pat. No. 4,685,648 describes the spiral pulley as "irregular" or "snail-shaped".

Figure 5:
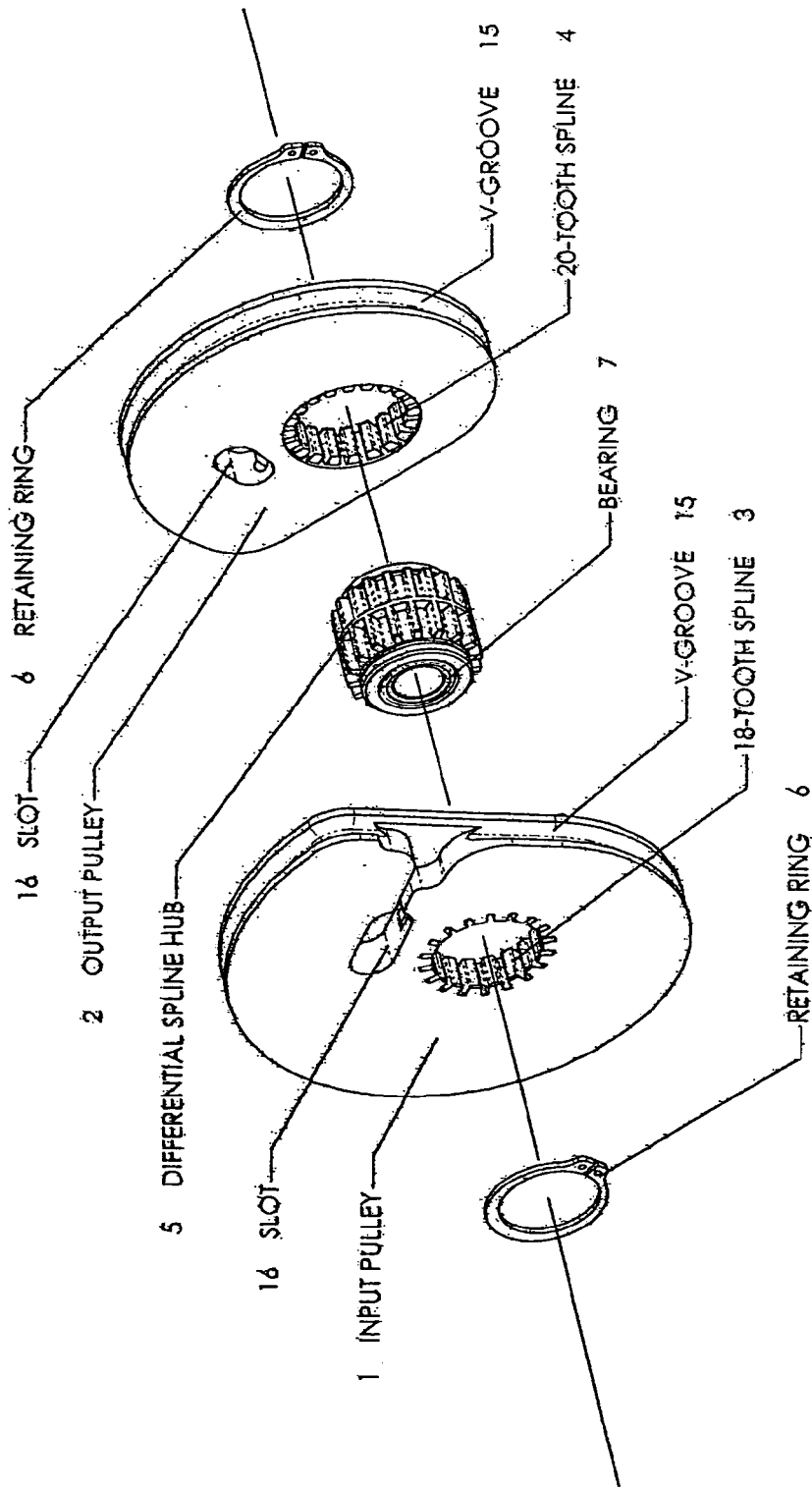
Figure 6:
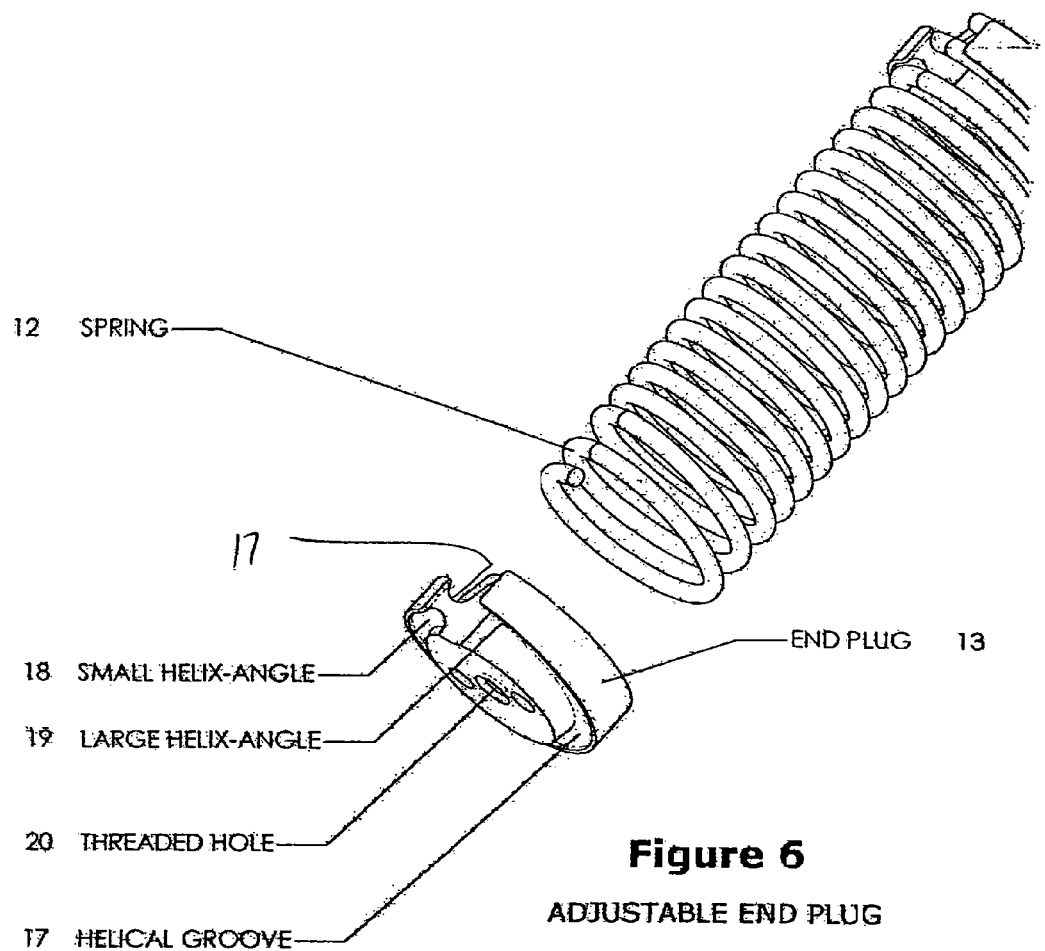
Figure 7:
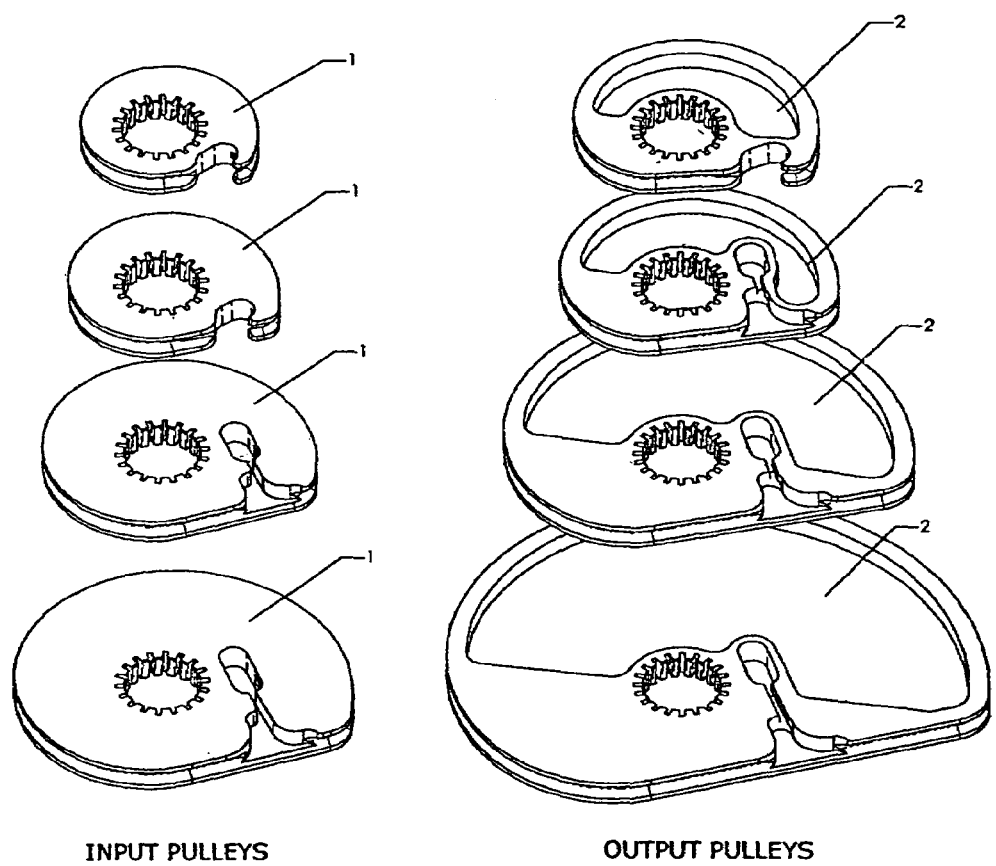

FIG. 7 of the 648 patent shows a constant force mechanism with two spiral pulleys. Both the input and the output pulleys are spiral shaped. In other patents and references, only one of the two pulleys has a spiral shape. In FIG. 5, only the input pulley is a spiral. In FIG. 6, only the output pulley is a spiral. The 648 patent does not explain how to determine the shapes that will produce a constant output force.

In FIGS. 2a, b, and c of this patent, prior art pulleys are accurately drawn to show the shapes required to deliver a constant force. In FIGS. 2a and 2c, the input pulleys have a spiral radius as in FIG. 5 of the 648 patent. In FIG. 2b, the output pulley has a spiral radius as in FIG. 6 of the 648 patent. For comparison, each of the figures is drawn to the same scale. Each of the three mechanisms is designed to deliver the same output force $F_{out}$ and stroke $L_2$.

In FIGS. 2a and 2b, the pulleys have been designed so that the spring extension $L_1$ is equal to the output stroke $L_2$. In FIG. 2c, the pulleys have been designed to minimize the size of the mechanism. The spring extension in FIG. 2c is much smaller than the output stroke. The resulting cable stress is much larger. Compared to the FIGS. 2a and 2b mechanisms, the life and load of the FIG. 2c mechanism is severely limited.

OBJECTS AND ADVANTAGES

It is an object of this invention to provide a pulley mechanism for converting the force from a linear spring into a constant force. The pulley mechanism should be significantly smaller than previous constant force pulleys.

It is a further object that the mechanism should be accurate and have low friction. If required, the mechanism should be adjustable so that a desired force can be reached even with commercial spring tolerances.

For general-purpose use, a limited number of pulley sizes should cover a wide range of applications. The required output force and travel may vary over a wide range. The orientation of the spring relative to the output cable may vary. The pulley mechanism should work with thousands of readily available helical extension springs. The pulleys should be easy to apply and use. Cable friction and wear caused by a nonzero fleet angle should be reduced or eliminated.

| Patent Figure Number | Description |
| --- | --- |
| 1a,b | Prior Art, Fusee |
| 2a,b,c | Prior Art, Dual Pulley Constant Force Mechanisms |
| 3a,b,c | Dual Pulley Constant Force Mechanisms |
| 4 | Dual Pulley and Spring Assembly with Differential Spline Hub |
| 5 | Dual Pulley Assembly with Differential Spline Hub |
| 6 | Adjustable End Plug |
| 7 | Pulley Assortment |
| 8 | Dual Pulley Assembly with Radial Grooves |
| 9 | Adjustable Spring and Dual Helical Pulley |
| 10 | One Piece, Dual Helical Pulley |
| 11 | Focused-Groove Dual Helical Pulley |
| 12 | Helical Spring, Force Deflection Curve |
| 13 | Pulley and Spring, Free Body Diagram |
| 14a,b | Radius of Constant and Linear Torque Profile Pulleys |
| 15a,b | Radius of Composite Torque Profile Pulleys |
| 16a,b | Radius of Parabolic Torque Profile Pulleys |
| 17 | Pulley Torque Profiles |
| 18a,b | Maximum Angle of Rotation |
| 19a,b | Composite Profile Input Pulley, Torque and Radius vs. Angle |
| 20a,b | Composite Profile Input Pulley, Torque and Radius vs. Angle |
| 21a,b | Composite Profile Output Pulley, Torque and Radius vs. Angle |
| 22 | Sinusoidal Transition for the Composite Torque Profile |
| 23 | Shape of Composite Input Pulley, with Center Distance "m" as a Parameter |
| 24 | Shape of Composite Output Pulley, with Center Distance "m" as a Parameter |

DESCRIPTION

Dual Pulley with Differential Spline Hub

Figure 4:
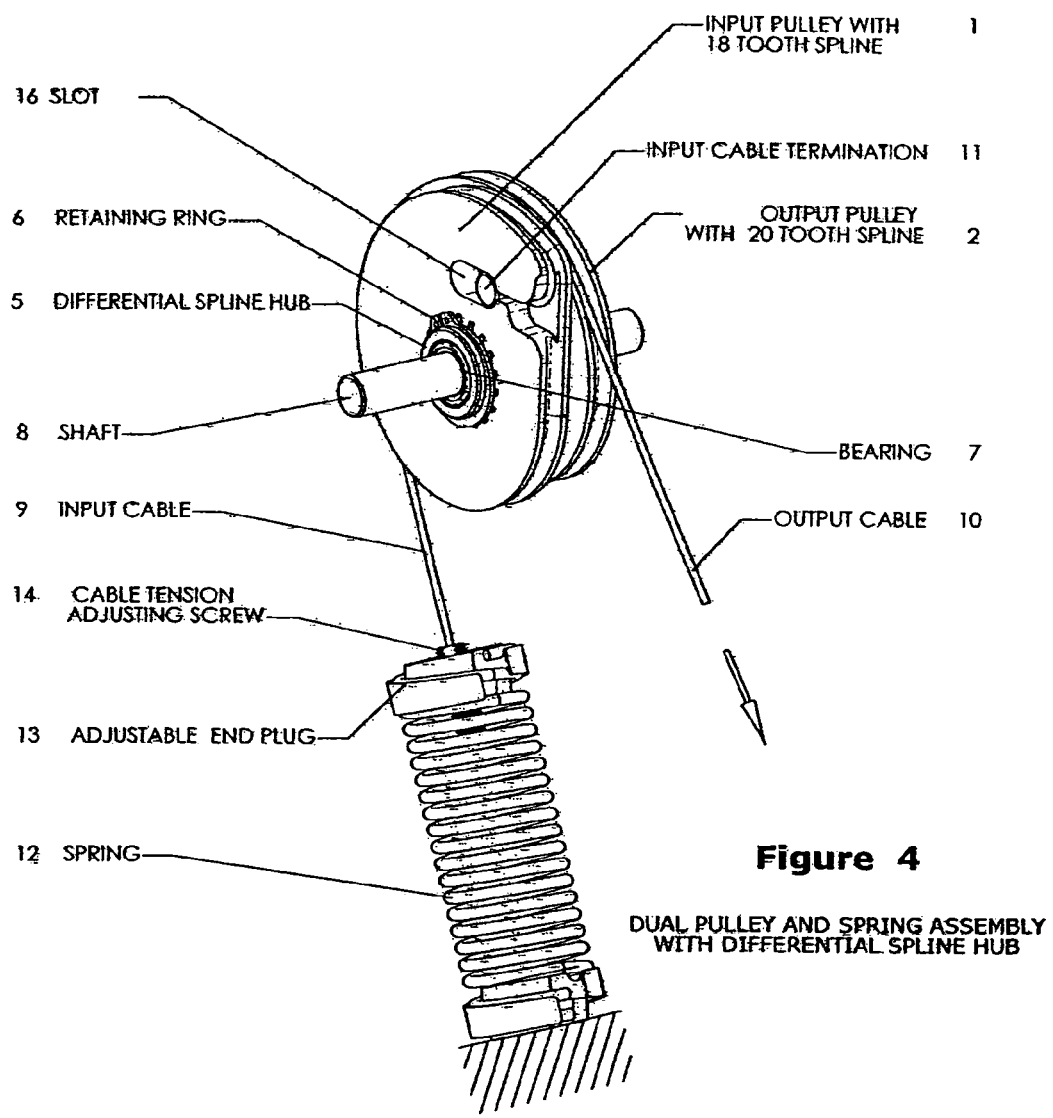

FIG. 4 shows a typical embodiment of the dual pulley constant force mechanism. FIG. 5 shows an exploded view of the dual pulley assembly. FIG. 6 shows an exploded view of the spring assembly.

The constant force mechanism has an input pulley 1 and an output pulley 2. Each pulley has one flat face. The flat face of one pulley rests against the face of the other. An 18 tooth internally splined hole 3 passes perpendicularly through input pulley 1. A 20 tooth internally splined hole 4 passes perpendicularly through output pulley 2.

The input pulley is attached to the output pulley with a differential spline hub 5. The hub is cylindrical. It has a round bore through its center and one external annular groove at each end. An 18 tooth external spline is located just inside the groove at one end of the hub. A 20 tooth external spline is located just inside the groove at the other end of the hub. The 18 tooth end of the hub 5 engages the splined hole in the input pulley 1, and the 20 tooth end of the hub engages the splined hole in the output pulley 2. The 18 tooth and 20 tooth combination provides for a total of 180 evenly spaced orientations of the two pulleys.

The assembly is held together with a retaining ring 6 in each hub groove. For low friction, a needle bearing 7 is pressed into the bore in the hub 5. When cost is more important than friction, the needle bearing can be eliminated, and the hub can act as a bearing. The dual pulley assembly rotates about a shaft 8 that passes through the bearing.

Both pulleys are non-circular. Each pulley has a v-groove 15 around its periphery. The shape or profile of the pulleys will be covered later. Input cable 9 rides in the v-groove of the input pulley 1. Output cable 10 rides in the v-groove of the output pulley 2. The force in the output cable is constant over the working range of the mechanism. A cable termination 11 is crimped onto one end of each cable. Each cable termination is captured in a slot 16 in the face of its pulley.

One end of a helical extension spring 12 is fixed to ground. An adjustable end plug 13 is screwed into the spring coils at the opposite or free end of the spring. A cable tension adjusting screw 14 is screwed into a threaded hole 20 in the center of the adjustable end plug. The adjusting screw has an axial hole 36 through its center. The free end of the input cable 9 passes through the hole in the adjusting screw. Another cable termination (not shown) is crimped onto the free end of the input cable.

Looking at FIG. 6, a helical groove 17 is formed into both faces of the end plug. The helix angle of the groove is not constant. The helix angle varies parabolically from a small helix-angle 18 at one end, to a large helix-angle 19 at the other end of the groove.

FIG. 7 shows a perspective view of an assortment of splined pulleys. There are four input pulleys on the left and four output pulleys on the right. Any one of the input pulleys can be combined with any one of the output pulleys to form a constant force mechanism.

Dual Pulley with Radial Grooves

Figure 8:
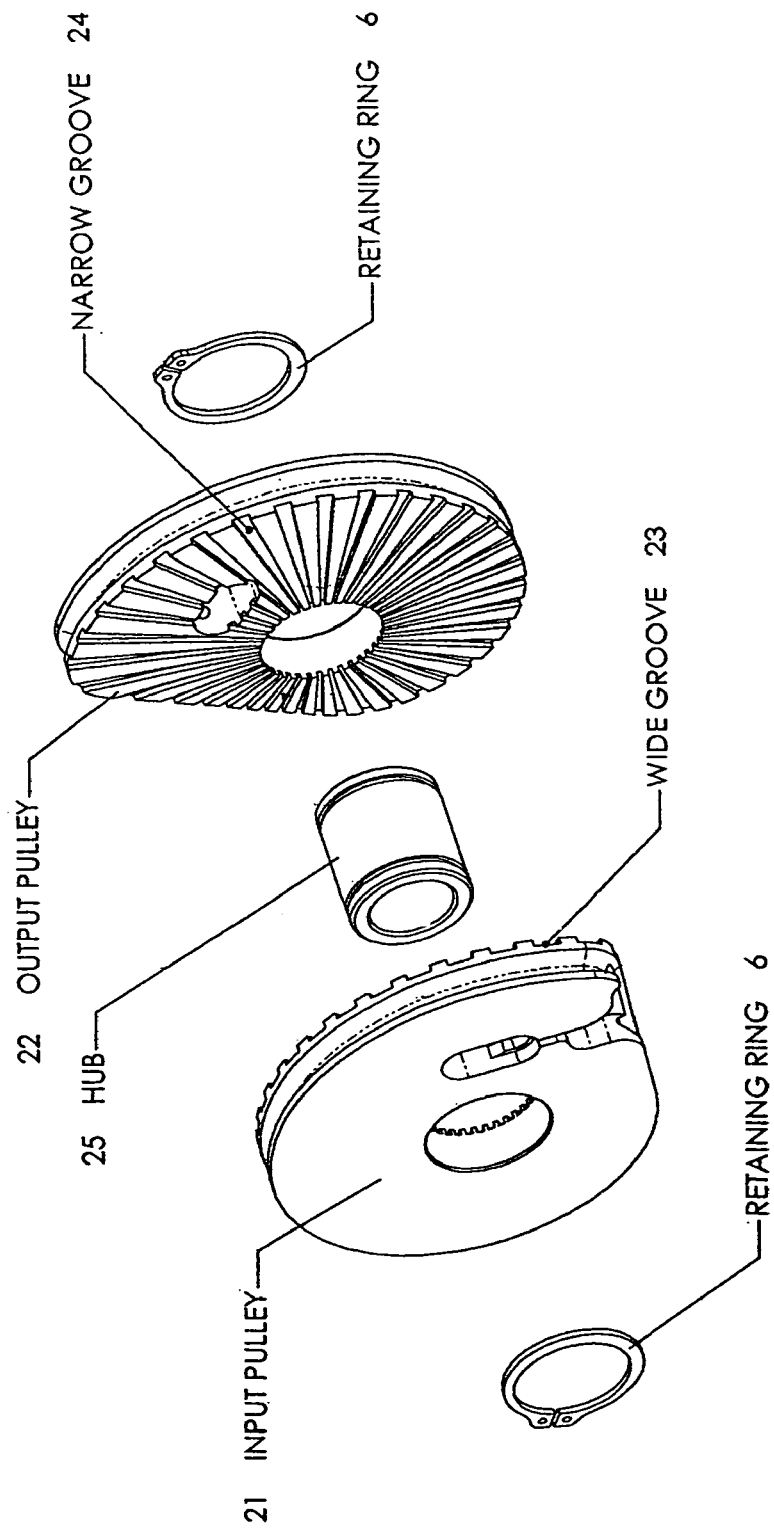

FIG. 8 shows an alternative construction for the dual pulley assembly. The input pulley 21 has 36 wide radial grooves 23 on one face. The output pulley 22 has 36 narrow radial grooves 24 on one face. The two pulleys can be assembled face to face in any one of 36 evenly spaced orientations. Narrow grooves are used on the output pulley and wide grooves on the input pulley so that it's impossible to accidentally assemble two input pulleys or two output pulleys. A cylindrical hub 25 has one external annular groove at each end. As before, the assembly is held together with a retaining ring 6 in each hub groove.

The radial groove design has several advantages. The hub is smaller in diameter than the differential spline hub. Smaller pulleys can be made with this construction. There are more grooves and they engage each other at a greater radius compared to the differential spline hub. The load carrying capability should be improved. The radial groove design does not have as fine an angular resolution as the differential spline hub.

Dual Helical Pulley

Figure 9:
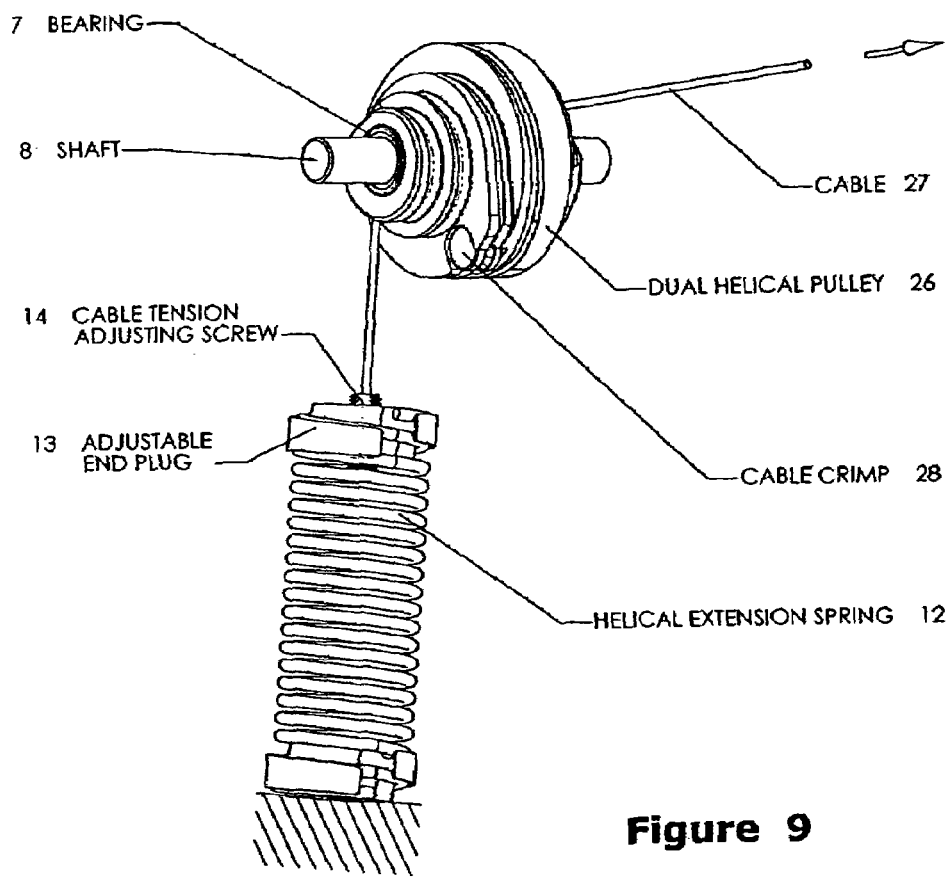
Figure 10:
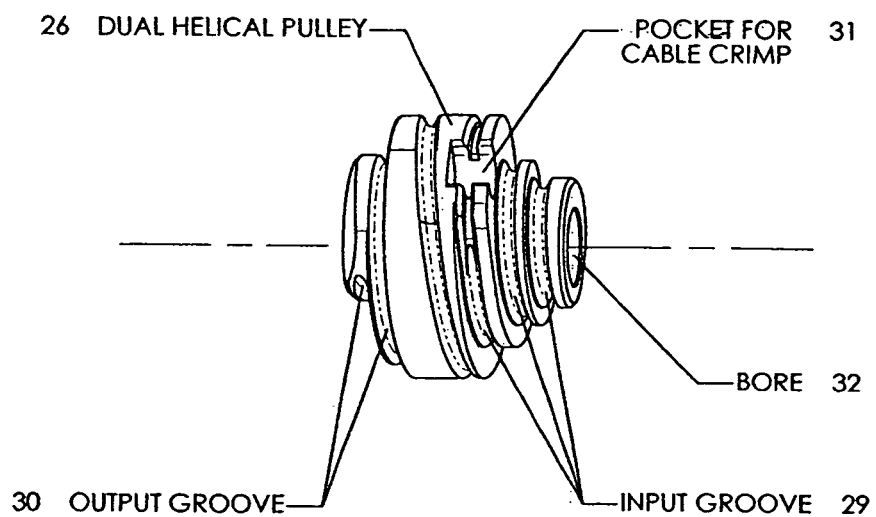
Figure 11:
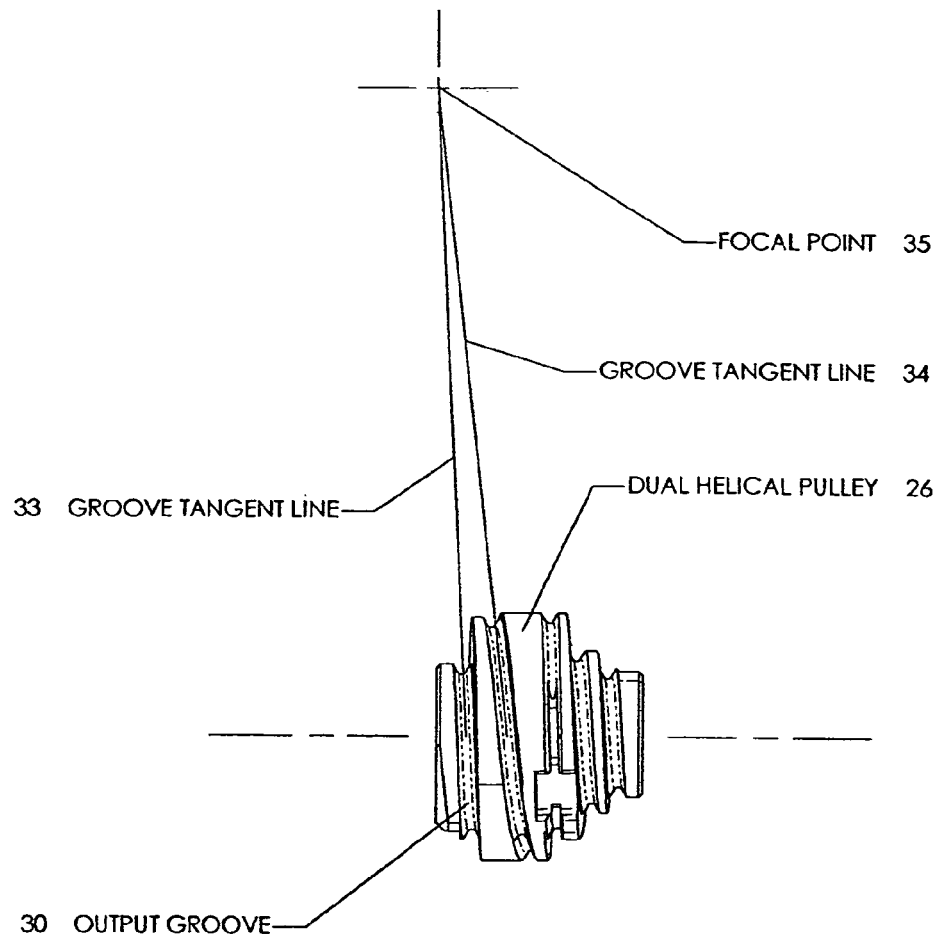

FIGS. 9, 10, and 11 show an alternative construction for the pulleys. The dual helical pulley 26 is not flat as before. The input v-groove 29 and the output v-groove 30 follow helical paths as they wind around the pulley. The input and output grooves intersect each other at their large diameter ends. This forms a single continuous groove. A single cable 27 winds around the groove. As before, a cable termination (not shown) attaches the cable to the adjusting screw 14, end plug 13, extension spring 12 assembly. A cable crimp 28 is located a measured distance along the cable. The crimp fits into a pocket 31 on the dual helical pulley.

The path of the v-groove is not a true helix. The axial advance of the groove is not constant with the rotation of the pulley. The groove advances axially at a rate that keeps the tangent to the groove aimed at a remote focal point 35. Figure 11 shows how the tangent lines 33 and 34 intersect at the focal point. The radial profile of the pulley v-grooves will be covered next.

Pulley Profile

Introduction

The pulley shape or profile is a complex subject. The pulley profile depends on several variables. For a given spring, output force, and travel, there are an infinite number of profiles. Some profiles are more useful than others are. One objective of the preferred embodiment is to minimize the size of the pulleys.

Figures 3A, 3B, 3C:
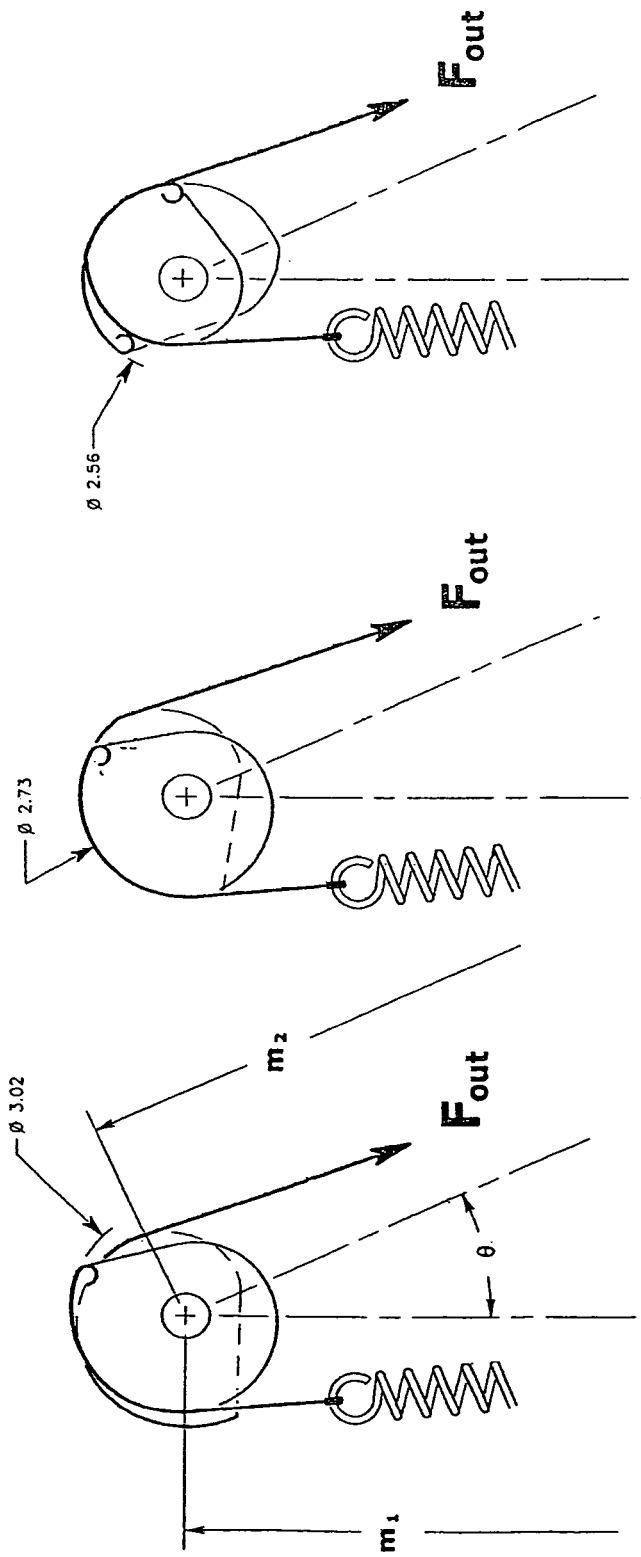

The preferred pulley profile is a composite of shapes. The output pulley has a constant radius portion, a sinusoidal radius portion, and a linear radius portion. The input pulley has a constant radius portion. It also has a portion where the radius is determined by a sinusoidal portion of its torque profile and it has a portion where its radius is determined by a linear portion of its torque profile. FIGS. 3b and 3c show input and output pulleys with composite profiles. For accurate comparison, the figures are drawn to the same scale as the prior art in FIGS. 2a, b, and c. All mechanisms in FIGS. 2 and 3 are designed to deliver the same output force $F_{out}$ and stroke $L_2$.

A better way to visualize pulley geometry is to look at a Cartesian graph of pulley radius as a function of angle. FIG. 14a shows a graph of the input pulley radius of the prior art spiral pulley in FIG. 2a. FIG. 14b shows a graph of the output pulley radius of the prior art spiral pulley in FIG. 2b. FIG. 15a shows a graph of the radius of the composite profile input pulley shown in FIG. 3b. FIG. 15b shows a graph of the radius of the composite profile output pulley, shown in FIG. 3b.

There are three different types of radii. This can be confusing. The true radius is the distance from the pulley axis of rotation to a point on the pulley. The tangent radius is the normal distance from the axis of rotation to a line that's tangent to the pulley. The radius of curvature has its common definition. All three radii are important. The size of the pulley depends on the true radius. For example, the spiral pulley in FIG. 2a has a very large true radius. The pulley torque is a function of the tangent radius. The bending stress in the cable depends on the radius of curvature.

There are two important angles. The pulley angle measures the pulley orientation relative to ground. The cable wrap angle measures the cable orientation relative to the pulley. The two angles are not the same because the orientation of the cable relative to ground changes as the pulley radius changes.

The pulley shape is a function of the cable wrap angle. A graph of the pulley radius as a function of the pulley angle does not fully define the pulley shape.

It will be shown that it's useful to specify pulleys by their torque profile, not their shape. Input pulleys have a different shape than output pulleys. The pulley shape depends on other variables. The constant force mechanism will work properly only if the torque profile for the input pulley is symmetric to the torque profile for the output pulley.

Pulley Radius Limitations

Not all of the spring energy can be converted to a constant output force. In FIG. 2a for example, the radius of the spiral pulley approaches infinity as the spring force approaches zero. An infinite radius is obviously impractical.

In FIG. 2b, the radius of the spiral pulley approaches zero as the spring force approaches zero. A very small radius is difficult to control accurately. Any radius error will produce a large force error. The pulley radius is also limited by the cable. The stress in the cable gets large as the pulley radius gets small.

Derivation of the Pulley Transfer Function

Figure 12:
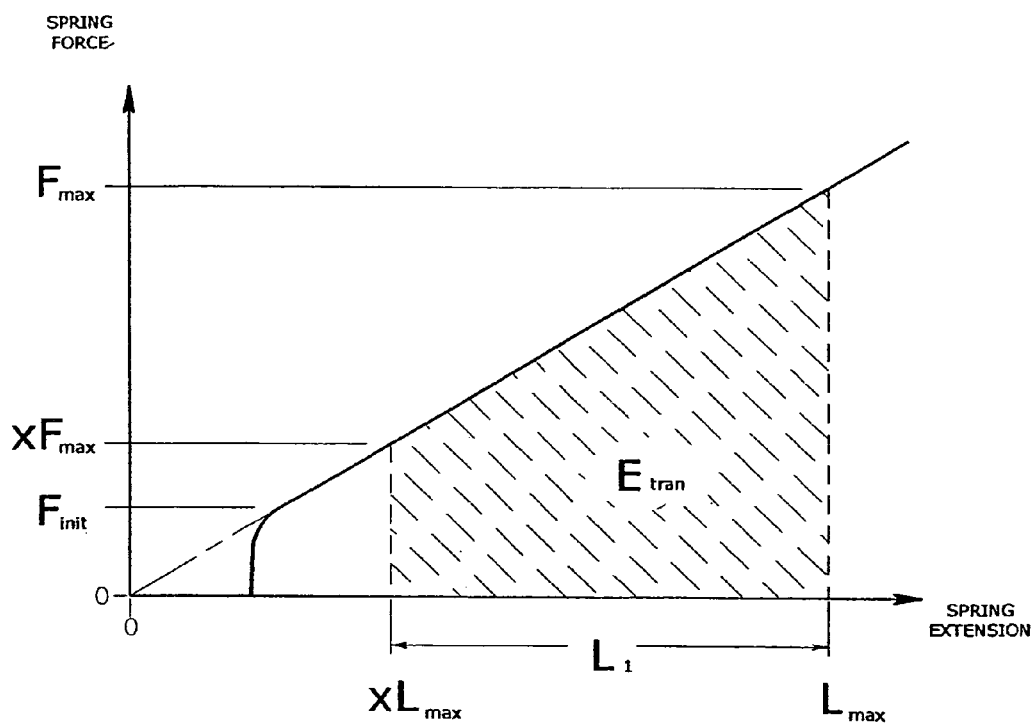

FIG. 12 is a graph of the force deflection curve for a typical extension spring. The curve is linear at forces greater than the initial tension $F_{init}$. The spring constant K is the slope of the curve. The linear portion of the curve can be extrapolated back to zero force so that L is the spring extension.

$$F = KL \qquad \text{Eq. 1}$$

Length $L_{max}$ is the theoretical distance, starting from zero force, required to reach a maximum force, $F_{max}$. E, is the energy required to extend a theoretical spring starting at a force of zero at zero extension, up to the maximum force $F_{max}$. This energy is equal to the total area under the curve.

$$E = \tfrac{1}{2} L_{max} F_{max}$$

The fraction x, is a number between zero and one. The constant force pulley mechanism operates between a force $xF_{max}$ and $F_{max}$. At the force $xF_{max}$, the spring is extended by a length $x L_{max}$. The distance $L_1$ is the operating spring extension between force $xF_{max}$ and $F_{max}$.

$$L_{max} = xL_{max} + L_1$$

or $$L_{max} = L_1/(1-x)$$

$E_{tran}$, is the energy transferred by the constant force pulleys when the spring is extended over its operating range, between $x L_{max}$ and $L_{max}$.

$$E_{tran} = F_{max}(1+x)L_1/2 \qquad \text{Eq. 2}$$

$F_{out}$ is the constant output force from the mechanism and $L_2$ is the output cable travel that corresponds to the operating spring extension $L_1$. If we assume that the pulley mechanism is frictionless, then by conservation of energy:

$$E_{tran} = F_{out}L_2 \qquad \text{Eq. 3}$$

Solving for $F_{out}$:

$$F_{out} = F_{max}(1+x)L_1/(2L_2)$$

The spring constant K can be calculated as follows:

$$K = (F_{max} - xF_{max})/L_1$$

Solving for $F_{max}$, and substituting into the previous equation yields:

$$F_{out} = \frac{L_1^2(1+x)K}{L_2(1-x)2} \qquad \text{Eq. 4}$$

Equation 4 can be converted to the following form:

$$E_{tran} = F_{out}L_2 = \frac{L_1^2(1+x)K}{(1-x)2} \qquad \text{Eq. 5}$$

Note that equations 4 and 5 do not depend on the shape of the pulleys. The equations hold for all six constant force mechanisms in FIGS. 2 and 3.

Derivation of the Pulley Profile

Figure 13:
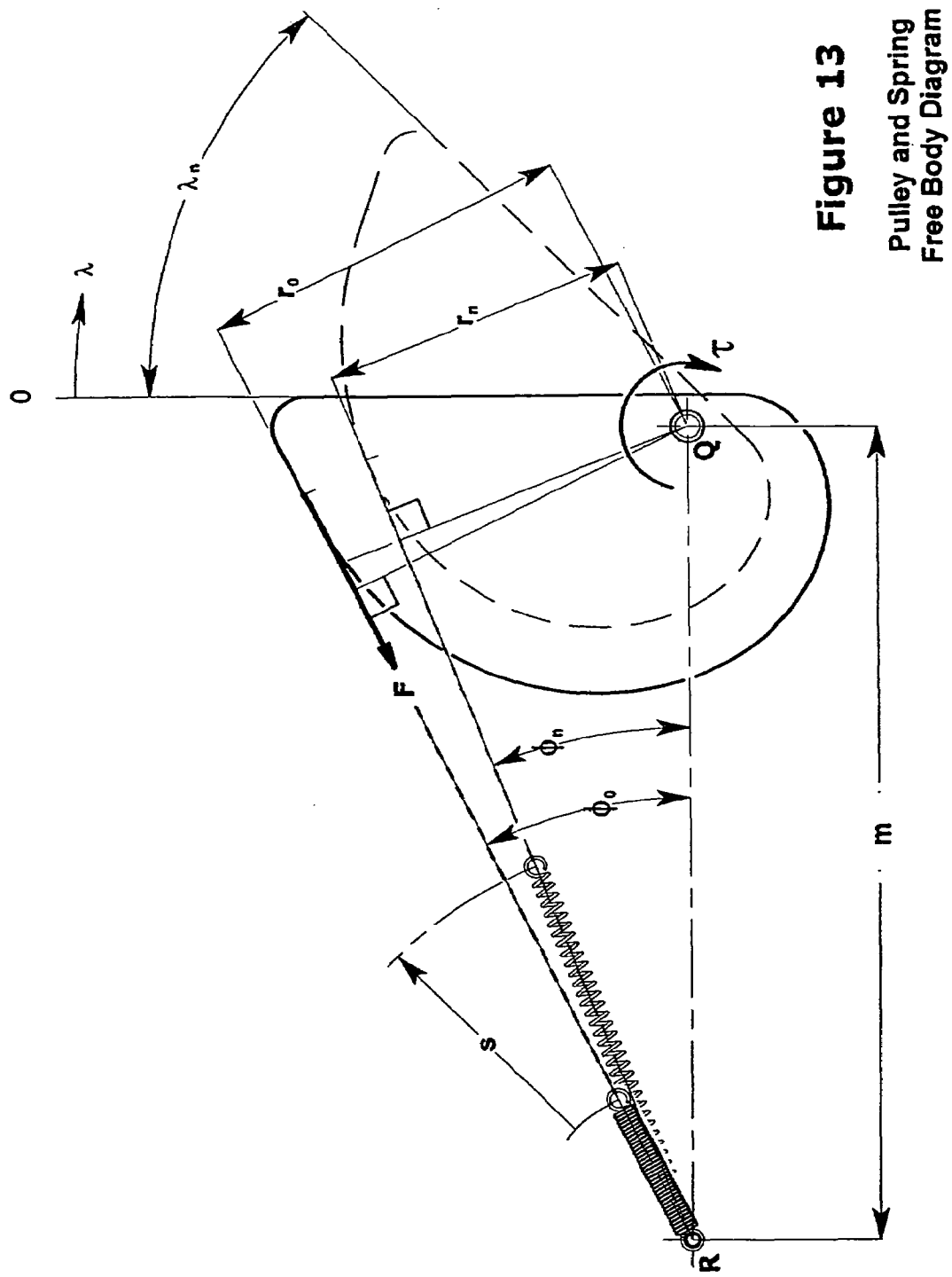

FIG. 13 shows a free body diagram of a pulley with a spring and cable. The pulley is mounted so that it's free to rotate about an axis that is perpendicular to the page at point Q. The spring is fixed in all three translational degrees of freedom at point R. The spring is free to pivot or bend about an axis perpendicular to the page at point R. Angle λ is the pulley angle of rotation, starting at λ=0. The initial force in the spring is $f_0$ where:

$$f_0 = xF_{max}.$$

The cable travel is s, starting with s=0, and $F=f_0$ at λ=0. The spring extension $L_1$ is defined above. $L_1$ is also equal to the total cable travel as the pulley rotates from λ=0 to $\lambda_{max}$. We can call $L_1$ the length of the input pulley.

$$L_1 = s \text{ at } \lambda_{max}$$

The following parameters fully determine the shape of each pulley.

m=The center distance between points Q and R.

$\lambda_{max}$=The maximum angle of pulley rotation.

F(s)=The cable force on the pulley. F is a function of s.

τ(λ)=The torque applied by the mating pulley. τ is a function of λ.

For the input pulley cable, the force is equal to the spring force:

$$F(s) = Ks + xF_{max} = Ks + f_0 \qquad \text{Eq. 6}$$

The torque τ on the input pulley produced by F is:

$$\tau = Fr \qquad \text{Eq. 7}$$
$$= (Ks + f_0)r$$

Solving for r: $\quad r = \dfrac{\tau}{(Ks + f_0)} \qquad \text{Eq. 8}$

When the pulley rotates by an angle dλ, the resulting spring extension will be:

$$d = r d\lambda$$

This can be converted into a finite difference equation.

$$s_n - s_{n-1} = r_{n-1} \Delta \lambda$$

$$s_n = r_{n-1} \Delta \lambda + s_{n-1} \qquad \text{Eq. 9}$$

Now converting equation 8 into a finite difference equation:

$$r_n = \frac{\tau_n}{(Ks_n + f_0)} \qquad \text{Eq. 10}$$

As seen in FIG. 13, when the pulley rotates by an angle $\lambda_n$, angle $\phi$ changes from $\phi_0$ to $\phi_n$. As a result, the orientation of the cable relative to the pulley changes by the cable wrap angle $\omega$, where:

$$\omega = \lambda_n \phi_n - \phi_0$$

Looking at angle $\phi$: $\phi = \sin^{-1}(r/m)$ $$\text{Thus: } \omega_n = \lambda_n + \sin^{-1}(r_n/m) - \sin^{-1}(r_0/m) \qquad \text{Eq. 11}$$

The initial Conditions are:

$$\lambda_0 = 0°$$
$$\omega_0 = 0°$$
$$s_0 = 0.$$
$$r_0 = \frac{\tau_0}{(Ks_0 + f_0)} = \frac{\tau_0}{f_0}$$

If we know the constants K, $f_0$, and m, and if we know the pulley torque profile $\tau(\lambda)$, then the pulley tangent radius r can be calculated as follows. Starting with the initial conditions above, using a small step size $\Delta\lambda$, the shape of the pulley can be solved numerically using equations 9, 10, and 11. The tangent radius as a function of the wrap angle gives us the pulley shape.

When the cable is constrained to pass through the perpendicular axis at point R, then the free body diagram in FIG. 13 is also valid for the output pulley. The same method can be used to determine the shape of the output pulley. For the output pulley cable, the cable force is constant and K=0.

$$F(s) = F_{out} = f_0$$

Prior Art Pulley Shape

FIGS. 2a, b, and c show examples of the prior art. In FIG. 2a, the output pulley has a constant radius. The torque between the input and output pulley can be calculated. Similarly, in FIG. 2b, the input pulley has a constant radius, and its torque profile can be calculated.

In FIG. 2a, the output pulley has a constant radius of $r_{out}$, and the torque is constant at:

$$\tau_a = F_{out} r_{out}$$

The equation for the torque between the pulleys in FIG. 2b can be calculated as follows. The input pulley has a constant radius of $r_{in}$. Using equation 6 for the force on the cable, the input pulley torque is:

$$\tau_b = (Ks + XF_{max}) r_{in}$$

The output force $F_{out}$ and stroke $L_2$ are determined by application requirements. If we make assumptions about any two of the three variables $L_1$, x, and K, we can solve for the third variable using equation 5. The center distance m can be selected to suit the geometric constraints of the application. We now have enough information to determine the shape of the pulleys for the prior art mechanisms in FIGS. 2a, 2b, and 2c.

Minimizing the Size of the Dual Pulley Mechanism

Many parameters affect the size of the dual pulley mechanism. These include the input pulley length $L_1$, the output pulley length $L_2$, the output force F, the spring constant K, the fraction of unused spring extension x, and the torque profile $\tau(\lambda)$ and $\lambda_{max}$. The center distances $m_1$ and $m_2$ affect the shape of the pulleys, but they have relatively little affect on the maximum size.

To make the problem easier, we can assume that several parameters are fixed. We can assume that we have a given task that requires a force $F_{out}$ over an extension $L_2$. We can also assume a value for x. All of the pulley mechanisms have similar problems if we try to make x too small. Finally, we can assume that $L_1 = L_2$.

The last assumption isn't always valid, but it's useful for the following reason. Mathematically, it's always possible to decrease the size of the input pulley $L_1$, by using a spring with a higher stiffness K. The higher stiffness and smaller input pulley will increase the load on the input cable. When $L_1 = L_2$, the maximum cable force $F_{in}$ is limited to $F_{in} < 2F_{out}$. When the size of the input pulley is reduced by decreasing $L_1$, the input cable force $F_{in}$ can grow much larger than $2F_{out}$. Setting $L_1$ equal to $L_2$ puts a limit on the maximum cable load.

Pulley Torque Profile

FIGS. 2a, b, c and 3a, b, c show six different constant force mechanisms. Each mechanism has been designed to deliver the same output force and stroke. For comparison, all figures have been drawn to the same scale. FIGS. 2a, b, and c are prior art. FIGS. 3a, b, and c are new. FIGS. 14, 15, and 16 show graphs of the pulley radius for most of the examples.

The torque is a constant for the mechanisms in FIGS. 2a and 2c. The mechanism in FIG. 2b has a linearly increasing torque profile.

The mechanism in FIG. 3a has a parabolic torque profile. The mechanisms in FIGS. 3b and 3c have composite torque profiles. The input cable travel is equal to the output cable travel or ($L_1 = L_2$) for all but FIGS. 2c and 3c.

FIG. 17 shows the torque profiles for all but the last mechanism. The same amount of energy is transferred by each mechanism. As a result, the area under each torque curve is the same. The pulley diameter can be minimized by maximizing the pulley angle of rotation. For a given type of torque profile, the pulley diameter is inversely related to the maximum angle of rotation.

Limit on the Maximum Angle of Rotation

For a flat pulley in which the groove lies in a plane, there is a limit on the angle of rotation. FIGS. 18a and 18b show two shapes for an input pulley with a constant torque profile. In FIG. 18a, the shape is calculated assuming the pulley will rotate to a maximum angle $\lambda_{max} = 230°$. In FIG. 18b, the shape is calculated assuming the maximum angle is a $\lambda_{max} = 300°$.

In FIG. 18b, the pulley collides with the cable well before reaching its 300° design limit. For flat pulleys, the shape shown in FIG. 18b is unacceptable. FIG. 18a shows that $\lambda_{max}$ is limited to a little more than 230° for the constant torque profile mechanism in FIG. 2a. The maximum angle of rotation is not the same for all torque profiles. The maximum angle may also depend on the center distance m, and the unused fraction of the spring extension x.

The Composite Profile Pulley

FIG. 19b is a graph of several composite torque curves. The bottom torque curve is shown with a heavy line. FIG. 19a is a graph of the corresponding input pulley radius for each of the torque curves. The lower pulley radius curve with the heavy line corresponds to the torque curve with the heavy line.

Only one of the input pulley curves has a constant radius segment. The input pulley will have a constant radius only if the torque curve is linear, and the slope and intercept of the line are properly matched. A torque curve that corresponds to a constant pulley radius can be found in the following way. Select a value for the desired torque at a zero pulley angle. This is the intercept. Then take a guess at the slope of the torque versus pulley angle line, and numerically solve for the pulley shape. If the radius is not constant, modify the slope and recalculate the pulley shape. This process can be used to iteratively solve for the slope of the torque curve that yields a constant pulley radius.

FIGS. 20a and 20b are graphs for an input pulley. The graph in FIG. 20b shows several composite torque curves. The graph in FIG. 20a shows the corresponding pulley radius curves. Using the above process, each torque curve has been selected so that the corresponding pulley radius curve is constant over part of its rotation.

The area under each of the torque curves in FIG. 20b is identical. As a result, each torque curve represents the same amount of energy. The energy is equal to the constant output force multiplied by the output cable travel $L_2$. Each composite curve has a linearly increasing portion and a constant portion. Each curve changes from linear to constant at a specific angle $\lambda_b$. The values of $\lambda_b$ yielding the desired energy can be solved for iteratively.

FIGS. 21a and 21b are graphs for an output pulley. Output pulley torque curves are shown in FIG. 21b. Note that the curves in FIGS. 20b and 21b are mirror images of each other. When the input pulley is at the start of its travel, or $\lambda_{input}=0°$, the output pulley is at the end of its travel or $\lambda_{output}=300°$. The torque curves are identical. They look reversed because they are shown relative to different coordinate systems.

FIG. 21a shows radius curves for the output pulley. These curves correspond to the torque curves in FIG. 21b. Each of the curves has a constant radius segment. Note that the constant radius portion of each curve corresponds to the constant portion of the torque curve. The constant radius portions of the input and output pulleys correspond to different parts of the torque curve.

With equal energy torque curves, when the maximum diameter of the input pulley decreases, the maximum diameter of the output pulley increases. As a result, the size of this dual pulley mechanism will be minimized when both the input pulley and the output pulley have the same constant diameter. This occurs approximately when $\lambda_b \cong 133°$ for the input pulley torque profile. Remember that we have also assumed that $L_1=L_2$.

If we relax the earlier assumption that $L_1=L_2$, then the size of the dual pulley can be reduced further. Decreasing $\lambda_b$ for the input pulley, decreases the diameter of the output pulley and increases the diameter of the input pulley. But if we let $L_1<L_2$, then the input pulley diameter can be reduced too. Solving iteratively with smaller values of $\lambda_b$ we find that the maximum allowable pulley angle $\lambda_{max}$ increases to $\lambda_{max} \cong 302°$ at $\lambda_b \cong 80°$. At values of $\lambda_b$ below 80°, the maximum allowable pulley angle $\lambda_{max}$ starts to decrease again. Eventually, the decreasing $\lambda_{max}$ will offset the effect of decreasing $\lambda_b$ and the pulley diameter will start getting larger again.

FIG. 3c shows the input and output pulleys with a composite torque profile and $\lambda_b \cong 80°$. The mechanism in FIG. 3c has the same output force F and extension $L_2$ as the previous five examples. The spring extension $L_1$ has been decreased by a factor of about 0.83. From equation 5, this will increase the input cable force by the reciprocal of 0.83 or by a factor of 1.20

In the limit, by decreasing $\lambda_b$ to zero, $\lambda_{max}$ decreases to a little over 130°, just as in FIG. 2a. We end up with the mechanism shown in FIG. 2c. Compared to FIG. 2a, the input pulley size $L_1$ is reduced by a factor of 0.28 Using equation 5, in FIG. 2c, the input cable force will increase by a factor of 3.5.

The mechanism in FIG. 3c is smaller and it has lower cable forces than the prior art mechanism in FIG. 2c.

Transition Between Segments of the Composite Torque Profile

An assumption was made in the previous section. The composite torque profiles are shown with sharp transitions between the linear and the constant segments. The torque profile can't make a sharp transition.

When a constant radius portion of a pulley makes a sharp transition to a decreasing radius, the torque profile follows a sinusoidal curve. Assuming a constant radius r and cable force F, the torque profile follows equation 12.

$$\tau=Fr\sin(\lambda) \quad \text{Eq. 12}$$

In other words, even if the radius drops sharply from r to a smaller radius, the torque is a function of the radius to the tangent, which is $r\sin(\lambda)$. FIG. 17 shows a composite torque profile with the sharpest sinusoidal transition between the segments. Note that the difference in area between the sharp transition and the sinusoidal transition represents only about 0.1% of the total area under the torque curve. As a result, the previous optimization is still valid.

When the torque profile has the sharpest sinusoidal transition between its segments, the pulley has a sharp corner. This is usually unacceptable.

The radius of curvature of the sharp corner is zero. This will overstress and rapidly fatigue a cable. The sharp corner in the pulley profile can be rounded off in a variety of ways. Arbitrarily rounding the corners of both pulleys will produce errors in the output force. The desired output force can be maintained by further rounding the torque profile and then calculating the input and output pulley profiles from the new torque profile.

A simple way to round the torque profile is to use a sinusoidal transition with a smaller magnitude than before. Equation 13 describes a new transition portion for the torque curve. $\tau_{const}$ is the constant portion of the torque profile and $\tau_{linear}$ is the linear portion of the torque profile. The new transition portion covers a full 90° of pulley rotation, from $\lambda=\lambda_1$, to $\lambda=(\lambda_1+90°)$.

$$\tau_{tran}=(Fr-S)+S\sin(\lambda-\lambda_1) \quad \text{Eq. 13}$$

Where
$\tau_{const}=Fr$
$\tau_{linear}=S\lambda+b$
$\lambda_1=(Fr-S-b)/S$
S=The slope of the linear portion
b=The intercept for the linear portion A graph of equation 13 is shown in FIG. 22. Note that the sinusoidal curve is tangent to both the linear and the constant portions of the original composite curve. The large radius transition decreases the area under the torque curve or the energy transferred by less than 0.4%.

Other Pulley Profiles

There are infinite pulley shapes that will produce a constant output force. Factors other than minimum size may be more important for some applications. For example, the life and strength of the cable is affected by the minimum bend radius of the pulleys. Alternatively, for another application, the sensitivity to cable angular alignment may be more important.

FIG. 17 shows an example of a parabolic torque profile. The peak torque $\tau_{max}$ occurs at the maximum pulley angle $\lambda_{max}$. The minimum torque $\tau_{min}$ occurs at $\lambda=0$. Finally, the minimum torque $\tau_{min}=0.4569\tau_{max}$. FIG. 3a shows a dual pulley mechanism with the given parabolic torque profile. For comparison, the mechanism is designed to deliver the same output force $F_{out}$ and stroke $L_2$ as the other mechanisms in FIGS. 2 and 3. FIG. 16a shows a plot of the input pulley radius and FIG. 16b shows a plot of the output pulley radius.

Note that the parabolic profile dual pulley mechanism is about 11% larger than the equivalent composite profile mechanism in FIG. 3b. The parabolic mechanism is about 25% smaller than the smallest equivalent prior art in FIG. 2b. There are infinite pulley shapes between the minimum sized composite profile and the prior art. Coefficients can be determined for a torque profile consisting of any higher order polynomial.

The Affect of the Center Distance on the Pulley Profile

The center distances $m_1$ and $m_2$ affect the shape of the pulleys. This occurs because the center distance affects the cable wrap angle. When the center distance is large, the pulley angle is the same as the cable wrap angle. The difference between the two angles increases when the center distance gets small. FIG. 23 shows the shape of an input pulley with a composite torque profile. The pulley shape is shown for a variety of center distances $m_1$. FIG. 24 shows the shape of an output pulley with a composite torque profile. The output pulley shape is shown for a variety of center distances $m_2$.

Standardization of the Pulleys

Input and output pulleys with symmetric torque profiles over a given range of pulley angle will produce a constant output force. The pulleys will behave according to equation 5.

$$E_{tran} = F_{out}L_2 = \frac{L_1^2(1+x)K}{(1-x)2}$$ Eq. 5

Two input pulleys may have identical torque profiles but different shapes. Both the center distance $m_1$ and the fraction x affect the shape of the input pulley. Center distance $m_1$ and the fraction x have no affect on the shape of the output pulley. Two output pulleys may have identical torque profiles but different shapes. The center distance $m_2$ affects the shape of the output pulley, but not the shape of the input pulley.

A series of sizes of input and output pulleys can be designed with symmetric torque profiles. The same value of x can be used for all input pulleys in the series. With x=0.3 the size of the pulleys is reasonable and most of the spring energy storage capacity is used. Each input pulley size $L_1$ can have a standard center distance $m_1$. Each output pulley size $L_2$ can have a standard center distance $m_2$. A good choice for the standard center distance will allow a pulley to be used over a wide range with little error. For example, assume that an output pulley with $L_2$=160 mm (6.30 inches) has a design center distance of $m_2$=12 inches. Looking at FIG. 24, there is little change in the pulley profile over the range of 8 in.<$m_2$<∞. For many applications, the pulley would work well over that range. For highest accuracy, the pulley should be used at its design center distance.

Pulley Alignment and Coupling

To function properly, the pulleys must be aligned relative to each other. Input and output pulleys must be connected by a torsionally rigid coupling. The profile of each pulley is generated relative to a line through point Q and point R as shown in FIG. 13. Phase angle θ is the angle between input pulley line QR and output pulley line QR.

For general purpose use, the ability to adjust θ is desirable. This allows the spring and cable to be located where they fit best for any application. There are many ways to connect and align the pulleys. As mentioned earlier, the preferred method with the differential spline hub is shown in FIGS. 4 and 5. FIG. 8 shows an alternative construction with radial grooves in one face of each pulley. There are many other ways of constructing an adjustable dual pulley mechanism. The two pulleys can be screwed together, with a bolt pattern evenly spaced in a circle. The dual pulleys can be manufactured in one piece. They can be welded or glued together. The pulleys can be press fit or staked onto the hub.

Adjustable Force End Plug

The output force from the dual pulley mechanism can be adjusted by changing the spring constant. Equation 4 shows that the output force $F_{out}$ is proportional to the spring constant K. Unfortunately, it's difficult to manufacture springs with a close tolerance on K. The tolerance on K for helical extension springs is typically no better than ±5. %.

FIG. 6 shows the threaded plug mechanism for adjusting the spring constant of the helical extension spring. The mechanism consists of a threaded plug that screws into either end of the spring. The plug has one turn of a custom screw thread. The load is applied to the spring through the end plug, rather than the through the typical end hook.

The compliance of a helical extension spring is proportional to the number of active coils. The spring constant K is equal to the reciprocal of its compliance. The number of active coils N can be adjusted by screwing the end plug into or out of the spring. This enables the plug to make a very fine adjustment of the output force. A tight tolerance on the spring constant is not needed.

The end plug has other benefits. It's significantly shorter than the usual end hooks. To save space, an end plug can be used at both ends of the spring. If properly designed, the end plug can reduce the maximum stress in the spring. The highest stress in an extension spring is usually located in the end hooks. With the lower stress, the spring will have a longer life. A plug mounted in the fixed end of the spring can be rigidly fixed to ground. For some applications, an internal thread geometry may fit better than the plug's external thread.

The thread pitch is not constant. The pitch starts at a low rate and it increases parabolicly over the single turn. The parabolic pitch is the same on both faces of the single thread. This results in a thread that is thin at both ends and thick in the middle. The spring coil that contacts the outside face of the thread follows the same parabolic pitch. As a result, the load from the coil is evenly distributed over the single turn. This eliminates the bending loads and stress produced by spring end hooks.

Helical Pulleys or Fusees

As shown earlier, when the pulley groove is constrained to a plane, the pulley rotation is limited to $\lambda_{max}$. The rotation limit can be avoided if the pulley groove advances axially as the pulley rotates.

A helix is commonly defined as a curve that lies on the surface of a cylinder or cone and cuts the element at a constant angle. The path of the groove of a constant force pulley would not fit this definition. The path may not lie on a cone, and the helix angle may not be constant. Helical will be used to differentiate these pulleys from flat pulleys.

For helical constant force pulleys, the radius to the groove can be calculated as it was for flat pulleys. Without the limitation on $\lambda_{max}$, the radius to the groove and the pulley diameter can be much smaller. The radius to the groove scales as $1/\lambda_{max}$.

One problem that arises with a helical pulley is that the cable can rub on the sides of the groove. For pulleys and capstans, the term "fleet angle", is defined as the angle between the cable and the tangent to the pulley groove. To limit friction and wear, it's desirable to keep the fleet angle small. This is not always possible, especially with short center distances $m_1$ or $m_2$.

The easiest way of designing the helical groove is to linearly advance the groove in an axial direction as the pulley rotates. This will produce a constant pitch groove. Alternately, the groove can be constructed with a constant helix angle. Both of these methods have fleet angle problems.

A preferred solution is to advance the groove axially at a rate that aims or focuses the tangent to the groove at a single remote point. The groove will start with a large helix angle at the large radius end of the helical pulley. The helix angle will decrease continuously to a small value at the small end of the pulley. A pulley with this type of "focused" groove is shown in FIGS. 9, 10, and 11. A fleet angle of zero can be maintained over many pulley revolutions. Ideally, the focus point should be located at the center distance m that is used to calculate the pulley radius profile. The figures show how input and output helical pulleys can be combined into a single structure. The grooves intersect each other at the large diameter ends of the pulleys. Depending on the required phase angle between the input and output pulleys, a transition groove may be needed between the two pulley grooves.

The single groove design eliminates one cable and two cable terminations. The loads and stresses produced by the cable terminations are eliminated. With the lower stress, the pulleys can be constructed from lower strength materials including plastics. The plastic may be of a type suitable for bearings. This will eliminate the need for separate bearings. The pulleys can rotate directly on a shaft.

For a single cable mechanism, if the tension ratio between the input and the output falls within the following range, the cable will not slip on the pulley.

$$e^{-\mu\theta} < F_{in}/F_{out} < e^{\mu\theta}$$

Where $\mu$ is the coefficient of friction between the pulley and the cable, and $\theta$ is the total wrap angle in radians, of the cable on the pulley. Friction will transfer the entire load between the cable and the pulley. A variety of other methods can be used to keep the cable from slipping. These include using a crimp, a knot, or a bead tied onto the cable. The crimp, knot, or bead can be retained by a slot that crosses the pulley groove. The cable can be jammed into a narrow or serrated slot in line with the pulley groove. Alternatively, the cable can be glued or welded in place.

A helical single groove dual pulley may have two or more parts that can be phased relative to each other as previously described.

Other Options

Dual pulleys can be designed to deliver output force profiles that are not constant. Pulleys can also be designed to accept other spring force profiles.

In this disclosure, the input and output pulleys are rigidly coupled. The pulleys can also be designed to work on two different axes similar to the prior art in FIGS. 1*a* and 1*b.*

The differential spline hub will work with other numbers of splines on each end.

The pulley v-grooves can be eliminated for some applications. For example, a flat strap can be used on a flat pulley surface. Chains can be used with toothed pulleys.

Advantages of the Composite Torque Profile, Dual Pulley, Constant Force Mechanism Smaller, Lighter, Less Inertia, Longer Cable Life, Higher Load, and Better Balance The composite torque profile minimizes the size of the pulleys. With smaller pulleys, less space is required, the pulleys are lighter, and they have much less rotational inertia.

Cable life and load can also be improved. Pulley size, cable life, and operating load are all related. The cable life is improved by increasing its bend radius and by decreasing the cable load. The bend radius is equal to the radius of curvature of the pulley, not the pulley radius. For a given pulley size, the composite torque profile maximizes the pulley radius of curvature. For a given pulley size, the composite profile also maximizes the input cable travel $L_1$. This reduces the spring and cable force. The lower force and the larger radius of curvature increase the cable life.

The composite torque profile pulleys are easier to balance. Compared to previous spiral pulleys, their center of gravity is closer to the axis of rotation. This makes it easier to balance the pulleys for greater force accuracy and less vibration.

Modular, Standardized, Low Cost, and Easy to Use

A small number of standardized input and output pulleys with symmetric torque profiles can be used to cover a wide range of constant force applications, from low force to high force and from short stroke to long stroke. Pairs of input and output pulleys can be used in combination with thousands of available extension springs. For a given output force and stroke, the spring can be selected for the required cycle life. Within limits, the spring length and outside diameter can be selected to fit the available space. Selecting appropriate input and output pulleys is a simple process. For most applications, a custom design isn't needed. The small number of pulley sizes needed to cover a wide range of applications should make it feasible to mass produce the pulleys at low cost.

The differential spline hub gives the freedom to orient the spring and the output cable where they fit best. With the hub, the pulleys can be rapidly and accurately assembled with high angular resolution.

Better Accuracy

A dual pulley mechanism can deliver an output force more accurately than a constant force spring. The force from a constant force spring fluctuates due to local geometric variations along the spring. Local variations along the length of a helical spring do not produce the same force variations.

The force error of a pulley mechanism is a linear function of the pulley profile. For example, if the pulley radius is 10% larger than it should be, the resulting force error will be 10%. The force error for a constant force spring is a cubic function of the spring thickness. A 10% thickness error will produce a force error of about 33%.

If a specific force is required from a dual pulley mechanism, an end plug can be used to adjust the helical spring. The output force can be adjusted to within a fraction of one percent. An expensive tight tolerance spring is not required. The tolerance for a constant force spring is typically about + or −10%.

Lighter Weight and Longer Life Spring

Helical extension springs are ideal for the dual pulley constant force mechanism. When operated at similar stress levels, helical springs can store approximately twice as much energy per pound compared to constant force springs. Constant force springs typically have a relatively low cycle life between 4,000 and 40,000 cycles. Helical springs can be designed for a much longer life.

Fusee Advantages:

Smaller Size, Fewer Parts, Less Wear and Friction, and Less Sensitive to Alignment Errors The outside diameter of the spiral pulley can be reduced by increasing the total rotation of the pulley. A multiturn spiral pulley is called a fusee. The fusee diameter can be much smaller than an equivalent flat spiral pulley. The fusee will be wider than the flat pulley.

A fusee is less sensitive to angle errors and to errors in the center distance m. With a larger total angle of rotation, the fusee radius changes more slowly. As a result, the fusee is less sensitive to angular alignment errors. When a cable wraps onto a variable radius pulley, the cable direction changes. The direction change is a function of both the center distance m and the total radius change of the pulley. A fusee with a greater total rotation will have a smaller radius change than an equivalent flat pulley. As a result, the fusee is less sensitive to center distance errors.

The focused groove aims the fusee groove at a remote point. This reduces the cable friction and wear.

The input and output grooves can be combined into one continuous groove. Only one cable is needed for the mechanism. With only one cable, the cable terminations can be eliminated. The stress produced by the cable terminations is eliminated too. With lower stress, the fusee can be made from a less expensive material. The fusee can be molded out of plastic. With a suitable plastic, the fusee can rotate directly on the shaft. Additional bearings aren't needed.

The fusee can be made in one piece. It can also be made in two or more parts, with the input pulley in one part and the output pulley in another part. A spline mechanism can be used to adjust and align the parts.

What is claimed is:

1. A mechanism to adjustably apply a counter-balance force in response to a load comprising:
   a spring;
   a pulley including an input groove and an output groove;
   an input cable having a first end coupled to the input groove and a second end connected with the spring;
   an output cable having a first end coupled to the output groove and a second end extending from the first end;
   wherein the pulley is adapted to transfer a counter-balance force to the second end of the output cable; and
   an adjustable end plug connected between the input cable and the spring;
   wherein the adjustable end plug includes a helical groove within which a coil of the spring is receivable; and
   wherein the adjustable end plug can be threaded along the coil of the spring to adjust the counter-balance force applied by the spring in response to the load.

2. A mechanism to adjustably apply a counter-balance force in response to a load comprising:
   a spring having a plurality of coils;
   an end plug screwed onto one or more of the coils so that the one or more coils is received in a helical groove of the end plug, wherein a spring constant of the spring is adjustable by selectively advancing or retreating the end plug along the coils of the spring;
   a dual pulley rotatable at a shaft, the dual pulley including:
     an input groove formed in a first surface; and
     an output groove formed in a second surface;
     wherein one or both of the first surface and the second surface has a radius that spirals outwardly from the shaft;
   an output cable connected with the output groove; and
   an input cable connected between the input groove and the end plug;
   wherein the spring applies a counter-balance force to the input cable, which counter-balance force is transmitted to the output cable by the dual pulley.

3. The mechanical mechanism of claim 2, wherein:
   the dual pulley further comprises an input pulley fixedly connected to an output pulley by a spline hub; and
   the input pulley includes the input groove and the output pulley includes the output groove.

4. The mechanism of claim 2, wherein:
   both of said first surface and said second surface have a radius that spirals outwardly from the shaft; and
   said first surface spirals outwardly in a direction that is opposite to a direction that said second surface spirals outwardly.

5. The mechanism of claim 2, wherein:
   the dual pulley is a dual helical pulley having an input groove that spirals outwardly in a counter-clockwise manner and an output groove that spirals outwardly in a clockwise manner.

6. The mechanical mechanism of claim 2 wherein the radius of one or both of the first surface and second surface is defined by a torque profile.

7. The mechanical mechanism of claim 6 wherein the torque profile is parabolic.

* * * * *